(12) United States Patent
Wu et al.

(10) Patent No.: US 11,412,548 B2
(45) Date of Patent: Aug. 9, 2022

(54) COMMUNICATION METHOD AND DEVICE

(71) Applicant: HUAWEI TECHNOLOGIES CO., LTD., Guangdong (CN)

(72) Inventors: Gengshi Wu, Shanghai (CN); Xiaolei Tie, Shanghai (CN); Jun Li, Shanghai (CN); Chao Ma, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/721,198

(22) Filed: Dec. 19, 2019

(65) Prior Publication Data

US 2020/0128589 A1 Apr. 23, 2020

Related U.S. Application Data

(63) Continuation of application No. PCT/CN2017/089560, filed on Jun. 22, 2017.

(51) Int. Cl.
H04W 74/08 (2009.01)
H04W 74/00 (2009.01)
(Continued)

(52) U.S. Cl.
CPC ....... H04W 74/0833 (2013.01); H04L 1/0026 (2013.01); H04W 48/12 (2013.01);
(Continued)

(58) Field of Classification Search
CPC ........... H04W 74/0833; H04W 74/004; H04W 74/006; H04W 48/12; H04W 72/042;
(Continued)

(56) References Cited

U.S. PATENT DOCUMENTS

2014/0098761 A1  4/2014 Lee et al.
2015/0016312 A1  1/2015 Li et al.
(Continued)

FOREIGN PATENT DOCUMENTS

CN  101854233 A  10/2010
CN  104285490 A  1/2015
(Continued)

OTHER PUBLICATIONS

Samsung, "Overall procedure for data transfer in inactive state", 3GPP TSG-RAN WG2 Meeting #6, R2-168051, XP051177750, Reno, USA, 14th to 18th Nov. 14-18, 2016, 6 pages.
(Continued)

Primary Examiner — Candal Elpenord
(74) Attorney, Agent, or Firm — Fish & Richardson P.C.

(57) ABSTRACT

This application provides a communication method and a device. The method includes: sending, by a terminal device to a network device, a random access preamble, receiving, by the terminal device, a random access response (RAR) from the network device, wherein the RAR indicates a first resource, and sending, by the terminal device, downlink channel quality indication information to the network device, wherein the downlink channel quality indication information is carried in a Message 3 on the first resource, and the downlink channel quality indication information is used to indicate downlink channel quality.

16 Claims, 6 Drawing Sheets

(51) Int. Cl.
  *H04W 48/12*  (2009.01)
  *H04W 52/50*  (2009.01)
  *H04L 1/00*   (2006.01)
  *H04W 72/04*  (2009.01)
  *H04W 52/36*  (2009.01)
  *H04W 52/14*  (2009.01)

(52) U.S. Cl.
  CPC ......... *H04W 52/143* (2013.01); *H04W 52/36* (2013.01); *H04W 52/50* (2013.01); *H04W 72/042* (2013.01); *H04W 74/004* (2013.01); *H04W 74/006* (2013.01)

(58) Field of Classification Search
  CPC ... H04W 72/04; H04W 52/143; H04W 52/36; H04W 52/50; H04L 1/0026
  USPC .................................................. 370/329–330
  See application file for complete search history.

(56) References Cited

U.S. PATENT DOCUMENTS

| | | | |
|---|---|---|---|
| 2016/0066337 A1 | 3/2016 | Sartori et al. | |
| 2016/0192376 A1* | 6/2016 | Lee ................... | H04W 72/0406 370/252 |
| 2016/0295609 A1* | 10/2016 | Vajapeyam ....... | H04W 74/0833 |
| 2016/0337073 A1 | 11/2016 | Kim et al. | |
| 2016/0345325 A1 | 11/2016 | Liu et al. | |
| 2017/0273113 A1* | 9/2017 | Tirronen ........... | H04W 72/0446 |
| 2017/0279646 A1* | 9/2017 | Yi ......................... | H04L 5/0007 |
| 2018/0019855 A1* | 1/2018 | Zhang ................ | H04L 1/0026 |
| 2018/0069593 A1* | 3/2018 | Yi ......................... | H04B 1/707 |
| 2018/0324854 A1* | 11/2018 | Phuyal ............... | H04W 74/085 |
| 2018/0368188 A1* | 12/2018 | Aiba ................ | H04W 74/0833 |
| 2019/0268949 A1* | 8/2019 | Menon ................ | H04B 17/327 |

FOREIGN PATENT DOCUMENTS

| | | |
|---|---|---|
| CN | 104812084 A | 7/2015 |
| CN | 105722105 A | 6/2016 |
| CN | 105916172 A | 8/2016 |
| CN | 106233794 A | 12/2016 |
| CN | 106559171 A | 4/2017 |
| EP | 2077692 A2 | 7/2009 |
| JP | 2016528791 A | 9/2016 |
| KR | 20090077640 A | 7/2009 |
| KR | 20090109068 A | 10/2009 |
| KR | 20160030252 A | 3/2016 |
| KR | 20160114688 A | 10/2016 |
| KR | 20160132482 A | 11/2016 |
| WO | 2016119652 A1 | 8/2016 |

OTHER PUBLICATIONS

LG Electronics, "RACH procedure for coverage enhancement of MTC Ues", 3GPP TSG RAN WG1 #74bis, R1-134393, XP050717518, Guangzhou, China, Oct. 7-11, 2013, 3 pages.
Extended European Search Report issued in European Application No. 17914955.4 dated May 20, 2020, 11 pages.
Office Action issued in Chinese Application No. 201780092235.X dated Aug. 31, 2020, 9 pages.
3GPP TS 36.321 V14.2.1 (Mar. 2017), 3rd Generation Partnership Project; Technical Specification Group Radio Access Network; Evolved Universal Terrestrial Radio Access (E-UTRA); Medium Access Control (MAC) protocol specification Release 14), Mar. 2017, 106 pages.
3GPP TS 36.213 V14.2.0 (Mar. 2017), "3rd Generation Partnership Project; Technical Specification Group Radio Access Network; Evolved Universal Terrestrial Radio Access (E-UTRA); Physical layer procedures(Release 14)," Mar. 2017, 454 pages.
3GPP TS 36.331 V14.2.2 (Apr. 2017) "3rd Generation Partnership Project; Technical Specification Group Radio Access Network; Evolved Universal Terrestrial Radio Access (E-UTRA); Radio Resource Control (RRC); Protocol specification Release 14)," Apr. 2017, 720 pages.
Huawei, Hisilicon, "On Transmit Power and Power Ramping for PRACH in Coverage Enhancement," 3GPP TSG RAN WG1 Meeting #81, R1-152456; Fukuoka, Japan, May 25-29, 2015, 6 pages.
Interdigital, "PRACH power ramping and power calculation," 3GPP TSG-RAN WG2 #93, R2-161652; St. Julian's, Malta, Feb. 15-19, 2016, 4 pages.
PCT International Search Report and Written Opinion issued in International Application No. PCT/CN2017/089560 dated Mar. 27, 2018, 15 pages (with English translation).
Ericsson, "Introduction of enhanced RLM reporting [online]," 3GPP TSG RA N WG2 #98, R2-1706183, Hangzhou, China, May 15-19, 2017, 2 pages.
Huawei, "Dedicated RACH Resource [online]," 3GPP TSG-RAN WG2 #62, R2-082696, Kansas City, USA, May 5-9, 2008, 3 pages.
Office Action issued in Japanese Application No. 2019-570451 dated Feb. 9, 2021, 8 pages (with English translation).
Office Action issued in Chinese Application No. 201780092235.X dated Apr. 22, 2021, 10 pages.
Office Action issued in Korean Application No. 2020-7001683 dated May 31, 2021, 12 pages (with English translation).
EPO Communication pursuant to Article 94(3) EPC issued in European Application No. 17914955.4 dated Dec. 3, 2021, 6 pages.
Office Action issued in Korean Application No. 2020-7001683 dated Feb. 24, 2022, 4 pages (with English translation).
Bi-lin et al., "Packet Scheduling Supporting Real-Time Data Service over Wireless Fading Channels," Journal of Electronics & Information Technology, Apr. 2006, 5 pages (with English abstract).
Office Action issued in Chinese Application No. 201780092235.X dated Mar. 18, 2022, 4 pages.

* cited by examiner

COMMUNICATION METHOD AND DEVICE

CROSS-REFERENCE TO RELATED APPLICATIONS

This application is a continuation of International Application No. PCT/CN2017/089560, filed on Jun. 22, 2017, the disclosure of which is hereby incorporated by reference in its entirety.

TECHNICAL FIELD

This application relates to the communications field, and in particular, to a communication method and a device.

BACKGROUND

Machine type communication (machine type communication, MTC), which may also be referred to as machine-to-machine (machine to machine, M2M) communication, or the internet of things (internet of things, IoT) is an important future application in the communications field. Future internet-of-things communication may mainly cover smart metering, medical detection and monitoring, logistics detection, industrial detection and monitoring, the internet of vehicles, intelligent communities, wearable device communications, and the like. An internet-of-things industry constructed based on MTC is considered as a fourth tide following computers, the internet, and mobile communications networks in the information industry, and is a future network development trend.

A type of important MTC communications system is a communications system based on an existing cellular network infrastructure, and this type of MTC is usually referred to as cellular MTC (cellular MTC) or a cellular IoT (cellular IoT, CIoT). Currently, a cellular MTC service mainly poses the following requirements on a network and a terminal device:

Requirement for wide coverage: A current visible MTC service usually does not need a quite high service rate, but needs a capability to support wide coverage. Wide coverage means that an MTC base station has a relatively strong coverage enhancement technology, and is capable of providing a communications service for user equipment in a case of a relatively high penetration loss (for example, 164 dB). For example, user equipment in a smart home or smart metering service, such as a smart water/electricity meter, is usually installed indoors or even in a basement. It is hard to provide a reliable communications service for devices at these locations by using an existing cellular network technology, whereas the MTC base station needs to provide a robust connection service for such devices.

Extremely large quantity of connections: For internet-of-things terminal devices deployed on a large scale, such as smart water/electricity meters, intelligent communities, monitoring devices, vehicles, and wearable devices, there may be a large quantity (more than tens of thousands or even hundreds of thousands) of such terminal devices served by one MTC base station, and the quantity is far greater than a quantity of existing mobile terminals. How a connection service is provided for such an enormous quantity of terminal devices at a same moment while network congestion is avoided is a problem that needs to be resolved.

Low costs (low costs): Costs of an MTC terminal device need to be lower than costs of an existing mobile terminal, and the low costs are a prerequisite for massively deploying MTC terminal devices.

Low power consumption (low power consumption): Because of diversity of actual application of an MTC terminal and various deployment environments, power is usually supplied to the MTC terminal device by using a battery. If batteries need to be replaced for such an enormous quantity of devices, extremely high manpower and time costs are paid. An MTC device usually requires an extremely low power consumption level for its functional components, so that the device can have a longer standby time, thereby reducing a quantity of battery replacement times.

The 3rd Generation Partnership Project (3rd generation partnership project, 3GPP) standards organization has been focusing on development of cellular MTC and actively carries out standardization of related technologies, for example, holds discussions related to a narrowband IoT (narrowband IoT, NB-IoT) system.

Because an NB-IoT system needs to support a quite large coverage area, for terminal devices in different communication environments, scheduling policies of a network device are totally different. For example, a terminal device at a central location of a cell has a desirable radio channel condition, and the network device can establish a reliable downlink by using only relatively low power, and can quickly complete data transmission by using technological means, such as a large transport code block, higher-order modulation, and carrier binding. However, a terminal device at the edge of the cell or in a basement has relatively poor radio channel quality, and the network device can maintain a link in need of relatively high power and can complete data transmission in a data transmission process by using technical means, such as a small code block, lower-order modulation, repeated sending for a plurality of times, and the spread spectrum.

To ensure communication reliability and reduce transmit power of the network device, terminal devices in different channel conditions need to be distinguished, to help the network device perform scheduling. In view of this, a concept "coverage level" is introduced in the NB-IoT system. Channel transmission conditions of terminal devices at a same coverage level are similar. The network device may use a similar scheduling parameter for such users, and control signaling overheads occupied by the users are also similar. For example, in the NB-IoT system, three coverage levels may be obtained in the downlink through classification. A coverage level of a terminal device relatively close to the network device is "common coverage" (for example, a coverage level 0), and a quantity of repetition times is 0. A coverage level of a terminal device relatively far away from the network device is "edge coverage" (for example, a coverage level 1), and a quantity of repetition times is 8 or 16. A coverage level of a terminal device in a scenario such as in a basement is "extended coverage" (for example, a coverage level 2), and a quantity of repetition times may be up to 32, 64, or greater. A terminal device selects a proper quantity of preamble (preamble) transmission times based on a coverage level, so that a quantity of unnecessary repetition times and power overheads can be reduced.

Currently, a coverage level in NB-IoT is a specific coverage level determined after the terminal device compares a downlink reference signal received power (reference signal received power, RSRP) measurement value with an RSRP threshold preconfigured by the network device. Specifically, the network device provides, in system message, RSRP decision thresholds of different coverage levels. The terminal device determines a corresponding coverage level based on a result of comparison between an RSRP and a decision threshold, and sends a preamble (preamble) on a narrowband physical random access channel (narrowband physical random access channel, NPRACH) resource corresponding to the coverage level. For a preamble corresponding to a minimum quantity of repetition times, the terminal device first sends the preamble by using relatively low power. If the sending fails, the terminal device increases its transmit power. For a preamble corresponding to another quantity of repetition times, the terminal device transmits the preamble by using maximum power.

From a perspective of a network device, the network device detects preambles on all NPRACH resources. Once the network device detects a preamble sent by a terminal, a coverage level of the terminal is determined based on a resource on which the detected preamble is located, and a quantity of repetition times of a downlink narrowband physical downlink control channel (narrowband physical downlink control channel, NPDCCH) is determined based on a magnitude of the estimated coverage level. A random access response (random access response, RAR) is further scheduled on the NPDCCH and fed back to the terminal device.

Based on the foregoing description, in the existing NB-IoT system, if a terminal device fails in performing access at a coverage level 0, the terminal device switches to a coverage level 1 for random access. According to an existing protocol, the terminal device needs to send a preamble by using maximum power. In this case, the terminal device is still at the coverage level 0 actually, and is relatively close to a network device. Therefore, if the preamble is sent by using the maximum power, a noise floor of a receiver of the network device is increased, affecting random access of a terminal device at another higher coverage level.

SUMMARY

Embodiments of this application provide a communication method and a device, to reduce impact on another terminal device.

According to a first aspect, a communication method is provided, where the method includes:

determining, by a terminal device, a current coverage level from at least two coverage levels, where each of the at least two coverage levels is corresponding to a power ramp step; and sending, by the terminal device to a network device in a power ramping manner based on a power ramp step corresponding to the current coverage level, a random access preamble.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

It should be understood that the power ramp step indicates a power increase amplitude when the terminal device resends a preamble after failing in sending the preamble at the current coverage level.

It should be understood that, in this embodiment of this application, after the terminal device sends a preamble, if no RAR is received, it indicates that the sending fails; or when the terminal device receives an RAR but the RAR does not include the sent preamble, it also indicates that the sending fails.

Optionally, in an implementation of the first aspect, the terminal device determines the current coverage level from the at least two coverage levels based on reference signal received power.

Optionally, in an implementation of the first aspect, the terminal device determines the current coverage level from the at least two coverage levels based on reference signal receiving performance.

Optionally, in an implementation of the first aspect, the determining, by the terminal device, the current coverage level from the at least two coverage levels based on reference signal receiving performance includes:

determining, by the terminal device, an initial coverage level based on the reference signal received power: and when the initial coverage level does not match the reference signal receiving performance, determining, by the terminal device, a coverage level corresponding to the reference signal receiving performance as the current coverage level.

For example, when the initial coverage level corresponding to the reference signal received power is a coverage level N, and the reference signal receiving performance is corresponding to a coverage level N+1, the terminal device determines that the current coverage level is the coverage level N+1; or when the initial coverage level corresponding to the reference signal received power is a coverage level N, and the reference signal receiving performance is corresponding to a coverage level N+2, the terminal device determines that the current coverage level is the coverage level N+2.

Optionally, in an implementation of the first aspect, the sending, by the terminal device to a network device in a power ramping manner based on a power ramp step corresponding to the current coverage level, a random access preamble includes:

when failing in sending the preamble last time, increasing, by the terminal device, transmit power of the preamble by the current power ramp step corresponding to the current coverage level, to obtain new power; and resending the preamble by using the new power.

It should be understood that, in this embodiment of this application, sending a preamble once indicates sending the preamble based on a quantity of repetition times corresponding to the current coverage level.

When sending for the first time fails, the terminal device resends the preamble after increasing first-time power by a power ramp step. Other cases are by analogy with the foregoing. Optionally, in actual application, the terminal device may determine, based on target received power of the preamble and a path loss between the terminal device and the network device, the transmit power of the preamble, where the target received power of the preamble is related to the current power ramp step and a current quantity of times of sending the preamble by the terminal device.

Optionally, the transmit power of the preamble is determined by the terminal device according to the following formula:

$$P_{NPRACH} = \min\{P_{CMAX}, P_{TARGET} + PL\} \text{ [dBm], where}$$

$P_{NPRACH}$ represents the transmit power of the preamble, $P_{CMAX}$ represents maximum transmit power of the terminal device, $P_{TARGET}$ represents the target received power of the preamble, and PL represents the path loss, where $$P_{TARGET} = P_P + (M-1)P_S, \text{ where}$$

$P_P$ represents initial target received power of the preamble, M represents the current quantity of sending times, and $P_S$ represents the current power ramp step; or $$P_{TARGET}=P_P+(M-1)P_S-10\times\log_{10} N_r, \text{ where}$$

$N_r$ is a quantity of repetition times of sending the preamble.

It should be understood that, in this embodiment of this application, $P_{CMAX}$ is a parameter $P_{CMAX,c}(i)$ in a protocol and indicates maximum transmit power of the terminal device in a serving cell c in an NB-IoT uplink slot i, $P_{TARGET}$ is a parameter NARROWBAND_PREAMBLE_RECEIVED_TARGET_POWER in the protocol or $P_{TARGET}$ is a parameter PREAMBLE_RECEIVED_TARGET_POWER in the protocol, PL is a parameter $PL_c$ in the protocol and indicates a downlink path loss, $P_P$ is a parameter preambleInitialReceivedTargetPower in the protocol, M is a parameter PREAMBLE_TRANSMISSION_COUNTER in the protocol, and $N_r$ is a parameter numRepetitionPerPreambleAttempt in the protocol.

It should be understood that the foregoing formula is only a specific form of determining the transmit power, and variation may be performed appropriately based on the foregoing formula. This embodiment of this application is not limited thereto.

Optionally, in an implementation of the first aspect, the method further includes:

when a quantity of times of sending the preamble by the terminal device at the current coverage level is greater than a first threshold, sending, by the terminal device, the preamble to the network device at a next coverage level of the current coverage level, where the first threshold is less than a maximum quantity of times of transmitting a preamble at each coverage level.

In this case, in this embodiment of this application, when the quantity of times of sending the preamble at the current coverage level is greater than the first threshold, coverage level switching may be performed. Because the first threshold is less than the maximum quantity of times of transmitting a preamble, when current channel quality is relatively poor, a quantity of unnecessary failures at the current coverage level can be reduced. This reduces a resource waste and improves network performance.

Optionally, in an implementation of the first aspect, the sending, by the terminal device, the preamble to the network device at a next coverage level of the current coverage level includes:

sending, by the terminal device, the preamble in a power ramping manner by using a quantity of repetition times corresponding to the next coverage level and the current power ramp step corresponding to the current coverage level.

Therefore, in this embodiment of this application, during level switching, the terminal device still sends the preamble by using power determined in a power ramping manner, and a prior-art manner of directly sending a preamble by using maximum power is abandoned. This can reduce impact on another terminal device. In addition, after the level switching, although the transmit power is determined in a previous power control manner, the preamble is sent based on the quantity of repetition times corresponding to the next coverage level, so that a quantity of repetition times of the preamble during each transmission can be increased, thereby improving an access success probability.

Optionally, in an implementation of the first aspect, the method further includes:

receiving, by the terminal device, indication information sent by the network device, where the indication information is used to indicate a quantity of repetition times of sending uplink information by the terminal device; and when the terminal device determines that the quantity of repetition times is greater than a second threshold, sending, by the terminal device, the uplink information by using maximum transmit power; or when the terminal device determines that the quantity of repetition times is less than or equal to the second threshold, sending, by the terminal device, the uplink information by using first power, where the first power is determined by the terminal device based on at least one of a path loss, a path loss compensation factor, or transmission bandwidth.

Optionally, in an implementation of the first aspect, the indication information is carried in an uplink grant UL grant, and the uplink information is uplink data; or the indication information is carried in a random access response RAR, and the uplink information is a Message 3.

Optionally, in an implementation of the first aspect, the second threshold is preset, the second threshold is indicated by the RAR, or the second threshold is configured by using a system message.

Optionally, in an implementation of the first aspect, the method further includes:

when the terminal device detects that a coverage level corresponding to downlink channel quality does not match the current coverage level, re-initiating, by the terminal device, a random access procedure at the coverage level corresponding to the downlink channel quality.

Specifically, after the terminal device completes a random access procedure, that is, when the terminal device performs data transmission with the network device, if the terminal device detects that the coverage level corresponding to the downlink channel quality does not match the current coverage level, the terminal device re-initiates the random access procedure based on the coverage level corresponding to the downlink channel quality, and then performs data transmission after the re-initiated random access procedure is completed.

Optionally, in an implementation of the first aspect, the method further includes:

sending, by the terminal device, downlink channel quality indication information to the network device, where the downlink channel quality indication information is carried in a Message 3 sent by the terminal device, and the downlink channel quality indication information is used to indicate downlink channel quality.

Optionally, in an implementation of the first aspect, the sending, by the terminal device, downlink channel quality indication information to the network device includes:

sending, by the terminal device, the downlink channel quality indication information to the network device based on an indication of configuration information, where the configuration information is carried in an RAR sent by the network device, or the configuration information is carried in a system message.

Optionally, in an implementation of the first aspect, the downlink channel quality indication information includes reference signal received quality RSRQ, or a quantity of NPDCCH repetition times during RAR demodulation by the terminal device.

Therefore, in this embodiment of this application, the terminal device reports the downlink channel quality, so that the network device can properly determine a maximum quantity of repetition times of sending a Message 4 and/or a maximum value of a UE-specific search space (UE-specific search space, USS) of the terminal device based on the downlink channel quality. This resolves an existing problem and avoids excessive power consumption of the terminal device and a system resource waste, thereby improving network performance.

According to a second aspect, a communication method is provided, where the method includes:

sending, by a terminal device to a network device, a random access preamble;

receiving, by the terminal device, a random access response RAR sent by the network device, where the RAR indicates a first resource, and sending, by the terminal device, downlink channel quality indication information to the network device, where the downlink channel quality indication information is carried in a Message 3 that is sent by the terminal device by using the first resource, and the downlink channel quality indication information is used to indicate downlink channel quality.

Optionally, in an implementation of the second aspect, the sending, by the terminal device, downlink channel quality indication information to the network device includes:

sending, by the terminal device, the downlink channel quality indication information to the network device based on configuration information, where the configuration information is carried in the RAR sent by the network device, or the configuration information is carried in a system message.

Optionally, in an implementation of the second aspect, the downlink channel quality indication information includes reference signal received quality RSRQ, or a quantity of NPDCCH repetition times during RAR demodulation by the terminal device.

Specifically, when the network device receives the downlink channel quality indication information, the network device can properly select, based on the downlink channel quality, a maximum quantity of repetition times of sending a Message 4. In addition, in an RRC connection establishment process, the network device properly configures a maximum value of a UE-specific search space USS of the terminal device based on the downlink channel quality.

Therefore, in this embodiment of this application, the terminal device reports the downlink channel quality, so that the network device can properly determine the maximum quantity of repetition times of sending the Message 4 and/or the maximum value of the UE-specific search space USS of the terminal device based on the downlink channel quality. This resolves an existing problem and avoids excessive power consumption of the terminal device and a system resource waste, thereby improving network performance.

According to a third aspect, a communication method is provided, including:

determining, by a terminal device, a current coverage level based on reference signal receiving performance; and performing, by the terminal device, random access at the current coverage level.

Optionally, in an implementation of the third aspect, the determining, by a terminal device, a current coverage level based on reference signal receiving performance includes:

determining, by the terminal device, the current coverage level based on the reference signal receiving performance and reference signal received power.

Optionally, in an implementation of the third aspect, the determining, by the terminal device, the current coverage level based on the reference signal receiving performance and reference signal received power includes:

determining, by the terminal device, an initial coverage level based on the reference signal received power; and when the initial coverage level does not match the reference signal receiving performance, determining, by the terminal device, a coverage level corresponding to the reference signal receiving performance as the current coverage level.

Optionally, in an implementation of the third aspect, the performing, by the terminal device, random access at the current coverage level includes:

sending, by the terminal device to a network device, a random access preamble, where transmit power of the preamble is determined by the terminal device based on target received power of the preamble and a path loss between the terminal device and the network device, and the target received power of the preamble is related to a current power ramp step and a current quantity of times of sending the preamble by the terminal device.

Optionally, in an implementation of the third aspect, the transmit power of the preamble is determined by the terminal device according to the following formula:

$P_{NPRACH} = \min\{P_{CMAX}, P_{TARGET} + PL\}$ [dBm], where $P_{NPRACH}$ represents the transmit power of the preamble, $P_{CMAX}$ represents maximum transmit power of the terminal device, $P_{TARGET}$ represents the target received power of the preamble, and PL represents the path loss, where $P_{TARGET} = P_P + (M-1)P_S$, where $P_P$ represents initial target received power of the preamble, M represents the current quantity of sending times, and $P_S$ represents the current power ramp step; or $P_{TARGET} = P_P + (M-1)P_S - 10 \times \log_{10} N_r$, where $N_r$ is a quantity of repetition times of sending the preamble.

Therefore, in this embodiment of this application, the terminal device may determine the current coverage level based on the reference signal receiving performance, so that the current coverage level can be flexibly and accurately determined, improving network performance.

According to a fourth aspect, a communication method is provided, including:

receiving, by a terminal device, indication information sent by a network device, where the indication information is used to indicate a quantity of repetition times of sending uplink information by the terminal device; and when the terminal device determines that the quantity of repetition times is greater than a second threshold, sending, by the terminal device, the uplink information by using maximum transmit power; or when the terminal device determines that the quantity of repetition times is less than or equal to the second threshold, sending, by the terminal device, the uplink information by using first power, where the first power is determined by the terminal device based on at least one of a path loss, a path loss compensation factor, or transmission bandwidth.

Optionally, in an implementation of the fourth aspect, the indication information is carried in an uplink grant UL grant, and the uplink information is uplink data; or the indication information is carried in a random access response RAR, and the uplink information is a Message 3.

Optionally, in an implementation of the third aspect, the second threshold is preset, the second threshold is indicated by the RAR, or the second threshold is configured by using a system message.

Therefore, in this embodiment of this application, because the specified second threshold is greater than 2, even if a quantity of repetition times configured by the network device for the Message 3 is greater than 2, the terminal device may send the Message 3 by using, for example, the first power instead of the maximum power, provided that the quantity of repetition times is less than the second threshold, so as to reduce a noise floor of the network device and reduce impact on another terminal device, thereby improving network performance.

According to a fifth aspect, a communication method is provided, including:

sending, by a network device, a reference signal to a terminal device, so that the terminal device determines a current coverage level from at least two coverage levels based on reference signal received power, where each of the at least two coverage levels is corresponding to a power ramp step; and receiving, by the network device, a random access preamble, where the preamble is sent by the terminal device in a power ramping manner based on a current power ramp step corresponding to the current coverage level.

Therefore, in this embodiment of this application, during level switching, the terminal device still sends the preamble by using power determined in a power ramping manner, and a prior-art manner of directly sending a preamble by using maximum power is abandoned. This can reduce impact on another terminal device.

Optionally, in an implementation of the fifth aspect, the method further includes:

sending, by the network device, indication information to the terminal device, where the indication information is used to indicate a quantity of repetition times of sending uplink information by the terminal device; and receiving, by the network device, the uplink information, where when the quantity of repetition times is greater than a second threshold, the uplink information is sent by the terminal device by using maximum transmit power; or when the quantity of repetition times is less than or equal to the second threshold, the uplink information is sent by the terminal device by using first power, where the first power is determined by the terminal device based on at least one of a path loss, a path loss compensation factor, or transmission bandwidth.

Optionally, in an implementation of the fifth aspect, the indication information is carried in an uplink grant UL grant, and the uplink information is uplink data; or the indication information is carried in a random access response RAR, and the uplink information is a Message 3.

Optionally, in an implementation of the fifth aspect, the second threshold is preset, the second threshold is indicated by the RAR, or the second threshold is configured by using a system message.

Optionally, in an implementation of the fifth aspect, the method further includes:

receiving, by the network device, downlink channel quality indication information sent by the terminal device, where the downlink channel quality indication information is carried in a Message 3 that is sent by the terminal device and that is received by the network device, and the downlink channel quality indication information is used to indicate downlink channel quality; and determining, by the network device, a maximum quantity of repetition times of sending a Message 4 and/or a maximum value of a USS of the terminal device based on the downlink channel quality.

Optionally, in an implementation of the fifth aspect, the downlink channel quality indication information is sent by the terminal device based on an indication of configuration information, where the configuration information is carried in an RAR sent by the network device, or the configuration information is carried in a system message.

Optionally, in an implementation of the fifth aspect, the downlink channel quality indication information includes reference signal received quality RSRQ, or a quantity of NPDCCH repetition times during RAR demodulation by the terminal device.

Therefore, in this embodiment of this application, the terminal device reports the downlink channel quality, so that the network device can properly determine the maximum quantity of repetition times of sending the Message 4 and/or the maximum value of the USS of the terminal device based on the downlink channel quality. This resolves an existing problem and avoids excessive power consumption of the terminal device and a system resource waste, thereby improving network performance.

According to a sixth aspect, a communication method is provided, including:

receiving, by a network device, a random access preamble sent by a terminal device;

sending, by the network device, a random access response RAR to the terminal device, where the RAR indicates a first resource;

receiving, by the network device, downlink channel quality indication information sent by the terminal device, where the downlink channel quality indication information is carried in a Message 3 that is sent by the terminal device by using the first resource, and the downlink channel quality indication information is used to indicate downlink channel quality; and determining, by the network device, a maximum quantity of repetition times of sending a Message 4 and/or a maximum value of a USS of the terminal device based on the downlink channel quality.

Optionally, in an implementation of the sixth aspect, the downlink channel quality indication information is sent by the terminal device based on an indication of configuration information, where the configuration information is carried in the RAR sent by the network device, or the configuration information is carried in a system message.

Optionally, in an implementation of the sixth aspect, the downlink channel quality indication information includes reference signal received quality RSRQ, or a quantity of NPDCCH repetition times during RAR demodulation by the terminal device.

Therefore, in this embodiment of this application, the terminal device reports the downlink channel quality, so that the network device can properly determine the maximum quantity of repetition times of sending the Message 4 and/or the maximum value of the USS of the terminal device based on the downlink channel quality. This resolves an existing problem and avoids excessive power consumption of the terminal device and a system resource waste, thereby improving network performance.

According to a seventh aspect, a communication method is provided, including:

sending, by a network device, indication information to a terminal device, where the indication information is used to indicate a quantity of repetition times of sending uplink information by the terminal device; and receiving, by the network device, the uplink information, where when the quantity of repetition times is greater than a second threshold, the uplink information is sent by the terminal device by using maximum transmit power; or when the quantity of repetition times is less than or equal to the second threshold, the uplink information is sent by the terminal device by using first power, where the first power is determined by the terminal device based on at least one of a path loss, a path loss compensation factor, or transmission bandwidth.

Optionally, in an implementation of the seventh aspect, the indication information is carried in an uplink grant UL grant, and the uplink information is uplink data; or the indication information is carried in a random access response RAR, and the uplink information is a Message 3.

Optionally, in an implementation of the seventh aspect, the second threshold is preset, the second threshold is indicated by the RAR, or the second threshold is configured by using a system message.

Therefore, in this embodiment of this application, because the specified second threshold is greater than 2, even if a quantity of repetition times configured by the network device for the Message 3 is greater than 2, the terminal device may send the Message 3 by using, for example, the first power instead of the maximum power, provided that the quantity of repetition times is less than the second threshold, so as to reduce a noise floor of the network device and reduce impact on another terminal device, thereby improving network performance.

According to an eighth aspect, a terminal device is provided, configured to perform the method in any one of the first to the fourth aspects or the possible implementations of the first to the fourth aspects. Specifically, the terminal device includes units configured to perform the foregoing method.

According to a ninth aspect, a network device is provided, configured to perform the method in any one of the fifth to the seventh aspects or the possible implementations of the fifth to the seventh aspects. Specifically, the network device includes units configured to perform the foregoing method.

According to a tenth aspect, a computer-readable medium is provided. The computer-readable medium stores a computer program, and when the computer program is executed by a computer, the method in any one of the first to the fourth aspects or the possible implementations of the first to the fourth aspects is implemented.

According to an eleventh aspect, a computer-readable medium is provided. The computer-readable medium stores a computer program, and when the computer program is executed by a computer, the method in any one of the fifth to the seventh aspects or the possible implementations of the fifth to the seventh aspects is implemented.

According to a twelfth aspect, a computer program product is provided. When the computer program product is executed by a computer, the method in any one of the first to the fourth aspects or the possible implementations of the first to the fourth aspects is implemented.

According to a thirteenth aspect, a computer program product is provided. When the computer program product is executed by a computer, the method in any one of the fifth to the seventh aspects or the possible implementations of the fifth to the seventh aspects is implemented.

According to a fourteenth aspect, a processing apparatus is provided, including a processor and an interface, where the processor is configured to perform the method in any one of the first to the fourth aspects or the possible implementations of the first to the fourth aspects.

According to a fifteenth aspect, a processing apparatus is provided, including a processor and an interface, where the processor is configured to perform the method in any one of the fifth to the seventh aspects or the possible implementations of the fifth to the seventh aspects.

It should be understood that the processing apparatus in the fourteenth aspect or the fifteenth aspect may be a chip, and the processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor, and exist independently.

DESCRIPTION OF EMBODIMENTS

Figure 1:
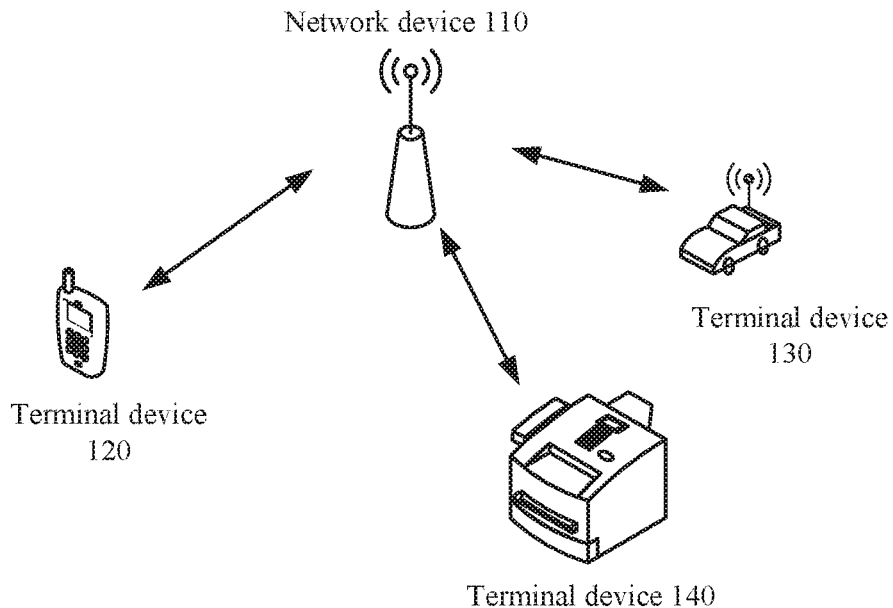
FIG. 1 is a schematic diagram of a scenario to which an embodiment of this application can be applied.

The following details technical solutions of this application with reference to the accompanying drawings.

It should be understood that the technical solutions in the embodiments of the present invention may be applied to NB-IoT communication. The NB-IoT communication may be carried in various communications systems. For example, the embodiments of this application may be applied to: a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex. TDD) system, a universal mobile telecommunications system (universal mobile telecommunication system. UMTS), a wireless local area network (wireless local area network, WLAN) system, a wireless fidelity (wireless fidelity. Wi-Fi) system, and a next-generation communications system, that is, a 5th generation (5th generation, 5G) communications system such as a new radio (new radio, NR) system.

In the embodiments of this application, a network device may be a base transceiver station (base transceiver station, BTS) in global system for mobile communications (global system of mobile communication, GSM) or code division multiple access (code division multiple access, CDMA); or may be a NodeB (nodeB, NB) in wideband code division multiple access (wideband code division multiple access, WCDMA); or may be an evolved NodeB (evolutional node B, eNB/eNodeB) in long term evolution (long term evolution, LTE), a relay node, an access point, a vehicle-mounted device, a wearable device, or a network-side device in a future 5G network, for example, a transmission point (TRP or TP) in an NR system, a next-generation NodeB (gNB) in an NR system, or one antenna panel or a group of antenna panels (including a plurality of antenna panels) of a gNB in a 5G system. This is not particularly limited in the embodiments of this application.

In the embodiments of this application, a terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, an unmanned aerial vehicle device, or a terminal device in a future 5G network. The terminal device may alternatively be an internet-of-things terminal device, such as a smart water meter, a smart electricity meter, a printer, or a smart television set.

FIG. 1 is a schematic block diagram of a wireless communications system 100 to which an embodiment of this application is applicable. The wireless communications system 100 may include a network device 110 and at least one terminal device, such as terminal devices 120, 130, and 140. The at least one terminal device may include any one of the terminal devices described above. For example, the terminal device 120 is user equipment, the terminal device 130 is a vehicle-mounted device, and the terminal device 140 is a printer. The at least one terminal device may communicate with the network device 110 through a cellular network. Different network devices corresponding to the at least one terminal device may be located at different geographic locations, for example, on a road, in a basement, and in a park. Therefore, channel conditions used by different terminal devices to communicate with the network device are not totally the same.

To ensure communication reliability and reduce transmit power of the network device, terminal devices in different channel conditions need to be distinguished, to help the network device perform scheduling. In view of this, a concept "coverage level" is introduced in an NB-IoT system. Channel transmission conditions of terminal devices at a same coverage level are similar. The network device may use a similar scheduling parameter for such users, and control signaling overheads occupied by the users are also similar.

As described above, in the existing NB-IoT system, if a terminal device fails in performing access at a coverage level 0, the terminal device switches to a coverage level 1 for random access. According to an existing protocol, the terminal device needs to send a preamble through an NPRACH by using maximum power. In this case, the terminal device is still at the coverage level 0 actually, and is relatively close to a base station. Therefore, if the preamble is sent through the NPRACH by using the maximum power, a noise floor of a receiver of a network device is increased, affecting RACH access of a terminal device at another higher coverage level. In view of this problem, an embodiment of this application provides a communication method: At a coverage level 1 and a coverage level 2, the terminal device can also send, in a power ramping manner, a random access preamble, and a prior-art solution of directly sending a preamble by using maximum power is abandoned. In this way, this embodiment of this application can resolve a problem that is caused by excessively high transmit power when the terminal device switches from a coverage level 0 to the coverage level 1, thereby reducing impact on another terminal device.

For ease of understanding and description, by way of example but not limitation, the following describes an execution process and actions in a communications system in a communication method in this application.

For ease of understanding the communication method in this specification, that a terminal performs complete service access procedure in this embodiment of this application is first described.

A terminal device may first detect a narrowband primary synchronization signal (narrowband primary synchronization signal, NPSS) and a narrowband secondary synchronization signal (narrowband secondary synchronization signal, NSSS), to obtain cell ID information and complete downlink synchronization, such as frame synchronization or symbol synchronization. Then, the terminal device obtains a system message, where the system message may include a reference signal received power threshold used by the terminal device to determine a coverage level. Afterwards, the terminal device determines a current coverage level, and sends a preamble through an NPRACH by using a quantity of repetition times and a resource that are corresponding to the current coverage level, to perform random access. After the random access, the terminal device may request to perform uplink scheduling for data transmission.

This embodiment of this application mainly describes improvements made in a random access procedure, as well as improvements made in a data transmission process.

Figure 2:
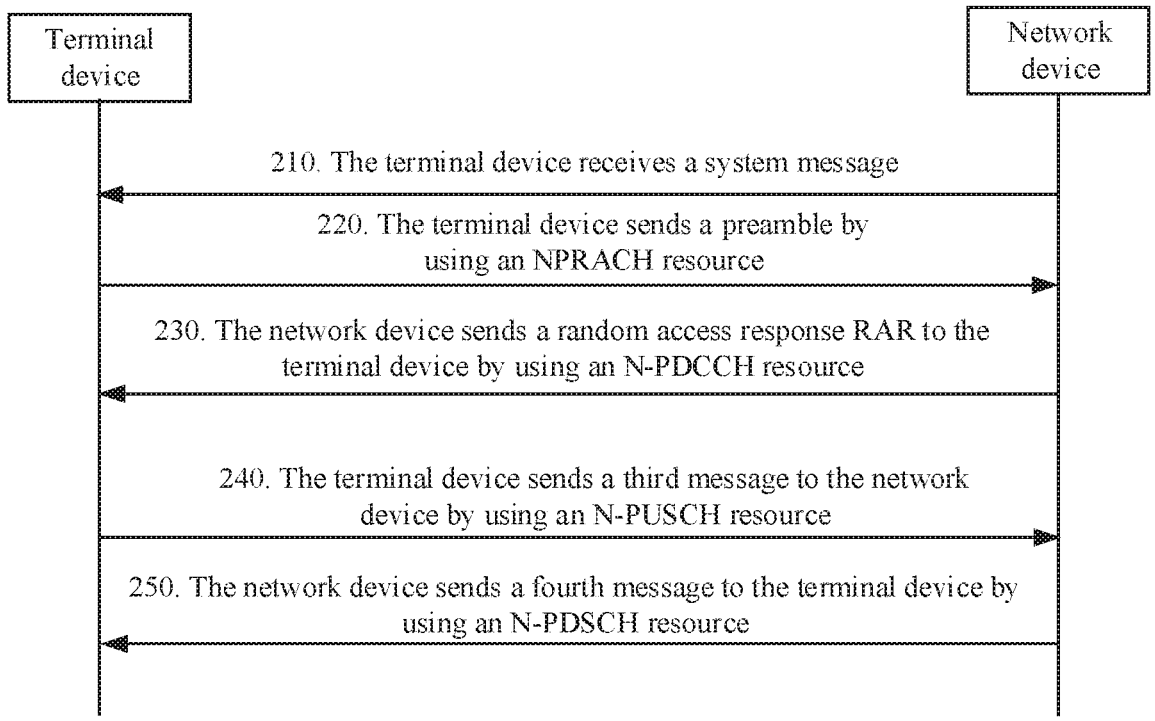
FIG. 2 is a schematic flowchart of a communication method according to an embodiment of this application.

For ease of further understanding the solutions of this application, the following first describes a random access procedure in an NB-IoT system in this embodiment of this application briefly. Specifically, a random access procedure 200 shown in FIG. 2 includes the following steps.

210. A terminal device receives a system message.

The system message may include various cell-level parameters, and may further include a coverage level threshold. The system message further includes indication information of an NPRACH resource corresponding to each coverage level, and the like. For example, the NPRACH resource may be a time domain resource, a frequency domain resource, or a time-frequency resource.

220. The terminal device sends a preamble by using an NPRACH resource.

For example, the terminal device may first determine a current coverage level, and then send the preamble on an NPRACH resource corresponding to the coverage level.

230. A network device sends a random access response RAR to the terminal device by using an NPDCCH resource.

240. The terminal device sends a Message 3 to the network device by using a narrowband physical uplink shared channel (narrowband physical uplink shared channel, NPUSCH) resource.

250. The network device sends a Message 4 to the terminal device by using a narrowband physical downlink shared channel (narrowband physical uplink downlink channel, NPDSCH) resource.

So far, after the terminal device receives the Message 4, it indicates a random access success, and the terminal device can send a data scheduling request or the like to the network device.

The foregoing only describes the random access procedure in this embodiment of this application briefly. Specifically, for content of each message in each process, refer to descriptions in a related standard. Details are not described in this embodiment of this application.

Improvements to one or more of steps 210 to 250 or improvements to data transmission after step 250 are made in the following embodiments of this application. The following specifically provides descriptions separately. It should be understood that improved steps are detailed in the following embodiments, and details of steps similar to those in the prior art are properly omitted.

The following details a communication method in the embodiments of this application with reference to the accompanying drawings.

It should be understood that, data transmitted between a network device and a terminal device in the communication method in the embodiments of this application may include but is not limited to the following content: a system message, a broadcast message, control signaling, signaling on a control channel, and data on a data channel.

It should be noted that some names and English abbreviations in this specification are used to describe the embodiments of this application by using an NB-IoT system as an example. However, the embodiments of this application are not limited thereto. The names and English abbreviations may vary with network evolution. For specific evolution, refer to descriptions in a corresponding standard.

Figure 3:
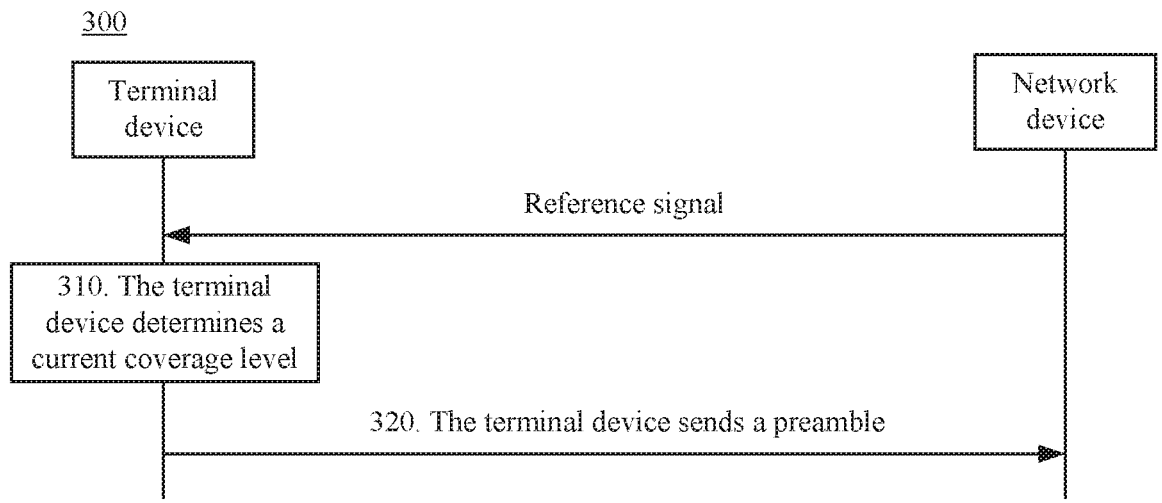
FIG. 3 is a schematic flowchart of a communication method according to another embodiment of this application.

FIG. 3 is a schematic flowchart of a communication method according to an embodiment of this application. As shown in FIG. 3, the method 300 includes the following steps.

310. A terminal device determines a current coverage level.

Specifically, the terminal device may determine the current coverage level from at least two coverage levels, and each of the at least two coverage levels is corresponding to a power ramp step (power ramping step).

It should be understood that the power ramp step indicates a power increase amplitude when the terminal device resends a preamble after failing in sending the preamble at the current coverage level. The power ramp step may also be referred to as a power increase step. This embodiment of this application is not limited thereto.

It should be understood that, in this embodiment of this application, after the terminal device sends a preamble, if no RAR is received, it indicates that the sending fails; or when the terminal device receives an RAR but the RAR does not include the sent preamble, it also indicates that the sending fails.

In this embodiment of this application, at least two power ramp steps corresponding to the at least two coverage levels may be not equal to each other, or at least two power ramp steps corresponding to the at least two coverage levels may be partially or all equal to each other. This is not limited in this embodiment of this application.

It should be understood that the at least two coverage levels in this embodiment of this application may mean two, three, four, five, or more coverage levels. Three coverage levels, that is, coverage levels 0, 1, and 2, are mainly used as an example for description in this specification. However, this is not limited in this embodiment of this application. In actual application, a quantity of coverage levels may be determined depending on an actual situation.

For example, a network device sends a reference signal to the terminal device, and the terminal device may determine the current coverage level from the at least two coverage levels based on reference signal received power (RSRP).

Specifically, the terminal device may obtain a threshold of the reference signal received power based on a system message, or the threshold of the reference signal received power is preset. This is not limited in this embodiment of this application. For example, the threshold of the reference signal received power may include two thresholds: a power threshold 1 and a power threshold 2, where the power threshold 1 is less than the power threshold 2. The terminal device compares an RSRP value with the two power thresholds, to determine the current coverage level. For example, when the RSRP value is less than the power threshold 1, it is determined that the current coverage level is a coverage level 2; when the RSRP value is greater than the power threshold 2, it is determined that the current coverage level is a coverage level 0; or when the RSRP value is between the power threshold 1 and the power threshold 2, it is determined that the current coverage level is a coverage level 1.

Optionally, the terminal device may alternatively determine the current coverage level from the at least two coverage levels based on reference signal receiving performance.

The reference signal receiving performance may include a signal-to-noise ratio (Signal Noise Ratio, SNR) of a reference signal or reference signal received quality (reference signal received quality, RSRP). For example, the terminal device may compare current receiving performance with a receiving performance threshold, to determine the current coverage level. It should be understood that, when the reference signal receiving performance is an SNR, the receiving performance threshold is an SNR threshold; or when the reference signal receiving performance is RSRP, the receiving performance threshold is an RSRP threshold. The receiving performance threshold may be carried in a system message, or may be preset by a system. This embodiment of this application is not limited thereto. For example, the reference signal receiving performance threshold may include two thresholds: a performance threshold 1 and a performance threshold 2, where the performance threshold 1 is less than the performance threshold 2. The terminal device compares a value of the reference signal receiving performance with the two performance thresholds, to determine the current coverage level. For example, when the value of the receiving performance is less than the performance threshold 1, it is determined that the current coverage level is a coverage level 2; when the value of the receiving performance is greater than the performance threshold 2, it is determined that the current coverage level is a coverage level 0; or when the value of the receiving performance is between the performance threshold 1 and the performance threshold 2, it is determined that the current coverage level is a coverage level 1.

Optionally, the terminal device may alternatively determine the coverage level based on reference signal received power and the reference signal receiving performance.

Specifically, the terminal device determines an initial coverage level based on the reference signal received power; and when the initial coverage level does not match the reference signal receiving performance, the terminal device determines a coverage level corresponding to the reference signal receiving performance as the current coverage level.

It should be understood that each coverage level in this embodiment of this application may be corresponding to a reference signal receiving performance range. The terminal device may first determine an initial coverage level based on the reference signal received power. When the initial coverage level matches the reference signal receiving performance, that is, when the reference signal receiving performance falls within a reference signal receiving performance range corresponding to the initial coverage level, the terminal device determines the initial coverage level as the current coverage level. When the initial coverage level does not match the reference signal receiving performance, that is, when the reference signal receiving performance is beyond the reference signal receiving performance range corresponding to the initial coverage level, the terminal device determines the coverage level corresponding to the reference signal receiving performance as the current coverage level.

For example, if RSRP measured by the terminal device at the beginning is at a coverage level N, but an SNR obtained through measurement is undesirable and is lower than an SNR at the current coverage level, the terminal device directly sends a preamble at a coverage level N+1 or a coverage level N+2 corresponding to the reference signal receiving performance.

For example, when the reference signal received power is corresponding to the coverage level N, and the reference signal receiving performance is corresponding to the coverage level N+1, the terminal device determines that the current coverage level is the coverage level N+1; or when the reference signal received power is corresponding to the coverage level N, and the reference signal receiving performance is corresponding to the coverage level N+2, the terminal device determines that the current coverage level is the coverage level N+2.

Specifically, in the prior art, a terminal device determines a coverage level based only on reference signal received power. However, there is a case: Reference signal receiving performance may be relatively poor although the reference signal received power is relatively high. If the coverage level is determined based only on the reference signal received power, a current channel status cannot be well reflected. Therefore, in this embodiment of this application, the terminal device may determine the current coverage level based on the reference signal receiving performance, so that the current coverage level can be flexibly and accurately determined, improving network performance.

It should be understood that, in this embodiment of this application, a next coverage level of the coverage level 0 is the coverage level 1, a next coverage level of the coverage level 1 is the coverage level 2, and so on. The coverage level 0 indicates best channel quality. As a coverage level increases, channel quality gradually deteriorates.

It should be understood that, in this embodiment of this application, each coverage level may be corresponding to a quantity of repetition times. The quantity of repetition times indicates a quantity of repetition times of sending a preamble by the terminal device. In other words, the quantity of repetition times indicates a quantity of times a preamble is repeated when the terminal device sends the preamble. For example, assuming that the preamble is A, when a quantity of repetition times corresponding to the current coverage level is 5, each time the terminal device sends the preamble at the current coverage level, the terminal device sends the following content: AAAAA.

320. The terminal device sends a preamble.

For example, the terminal device sends, to the network device in a power ramping manner based on a current power ramp step corresponding to the current coverage level, a random access preamble.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

Specifically, when failing in sending the preamble last time, the terminal device increases transmit power of the preamble by the current power ramp step corresponding to the current coverage level, to obtain new power; and resends the preamble by using the new power.

It should be understood that sending the preamble by the terminal device in a power ramping manner may also be referred to as sending the preamble by the terminal device in a power increasing manner. This embodiment of this application is not limited thereto.

For example, when the terminal device sends the preamble at the current coverage level for the first time, the terminal device sends the preamble by using first-time power.

It should be understood that, in this embodiment of this application, sending a preamble once indicates sending the preamble based on a quantity of repetition times corresponding to the current coverage level.

When the sending for the first time fails, the terminal device resends the preamble after increasing the first-time power by a power ramp step. Other cases are by analogy with the foregoing. Optionally, in actual application, in step 320, the terminal device may determine, based on target received power of the preamble and a path loss between the terminal device and the network device, the transmit power of the preamble, where the target received power of the preamble is related to the current power ramp step and a current quantity of times of sending the preamble by the terminal device.

It should be understood that the current quantity of sending times may indicate a quantity of times of sending the preamble by the terminal device. For example, if a current preamble to be sent is resent after the terminal device fails in sending the preamble Z times, the current quantity of sending times is equal to Z+1, indicating that the terminal device is sending the preamble for a $(Z+1)^{th}$ time.

Optionally, the transmit power of the preamble is determined by the terminal device according to the following formula:

$$P_{NPRACH} = \min\{P_{CMAX}, P_{TARGET} + PL\} \text{ [dBm], where}$$

$P_{NPRACH}$ represents the transmit power of the preamble, $P_{CMAX}$ represents maximum transmit power of the terminal device, $P_{TARGET}$ represents the target received power of the preamble, and PL represents the path loss, where $$P_{TARGET} = P_P + (M-1)P_S, \text{ where}$$

$P_P$ represents initial target received power of the preamble, M represents the current quantity of sending times, and $P_S$ represents the current power ramp step; or $$P_{TARGET}=P_P+(M-1)P_S-10\times\log_{10} N_r, \text{ where}$$

$N_r$ is a quantity of repetition times of sending the preamble.

It should be understood that, in this embodiment of this application, $P_{CMAX}$ is a parameter $P_{CMAX,c}(i)$ in a protocol and indicates maximum transmit power of the terminal device in a serving cell c in an NB-IoT uplink slot i, $P_{TARGET}$ is a parameter NARROWBAND_PREAMBLE_RECEIVED_TARGET_POWER in the protocol or $P_{TARGET}$ is a parameter PREAMBLE_RECEIVED_TARGET_POWER in the protocol, PL is a parameter $PL_c$ in the protocol and indicates a downlink path loss, $P_P$ is a parameter preambleInitialReceivedTargetPower in the protocol, M is a parameter PREAMBLE_TRANSMISSION_COUNTER in the protocol, and $N_r$ is a parameter numRepetitionPerPreambleAttempt in the protocol.

It should be understood that the foregoing formula is only a specific form of determining the transmit power, and variation may be performed appropriately based on the foregoing formula. This embodiment of this application is not limited thereto.

Optionally, in another embodiment, when a quantity of times of sending the preamble by the terminal device at the current coverage level is greater than a first threshold, the terminal device sends the preamble to the network device at a next coverage level of the current coverage level, where the first threshold is less than a maximum quantity of times of transmitting a preamble (maximum number of preamble transmission attempts per enhanced coverage level, maxNumPreambleAttemptCE) at the current coverage level defined in a standard.

Specifically, if the terminal device still fails after attempting for a quantity of times at the coverage level N, where the quantity of times is equal to the first threshold, the terminal device directly sends the preamble at the coverage level N+1.

Specifically, in an existing solution, the terminal device switches to a next coverage level to send the preamble, only after the quantity of times of sending the preamble at the current coverage level is greater than the maximum quantity of times of transmitting a preamble at the current coverage level.

In contrast, in this embodiment of this application, when the quantity of times of sending the preamble at the current coverage level is greater than the first threshold, coverage level switching may be performed. Because the first threshold is less than the maximum quantity of times of transmitting a preamble, when current channel quality is relatively poor, a quantity of unnecessary failures at the current coverage level can be reduced. This reduces a resource waste and improves network performance.

It should be understood that, in this embodiment of this application, after switching to the next coverage level is performed, the preamble may be sent by using a resource corresponding to the next coverage level, a quantity of repetition times corresponding to the next coverage level, or power corresponding to the next coverage level.

For example, after switching from a coverage level N to a coverage level N+1, the terminal device may send the preamble by using a resource and power that are corresponding to the coverage level N+1.

Optionally, after switching to the coverage level N+1, the terminal device may send the preamble by using maximum power.

Optionally, after switching to the next level, the terminal device may alternatively send the preamble at the next level in a power ramping manner.

Specifically, the manner of switching to the coverage level N+1 and sending the preamble in a power ramping manner may be similar to sending the preamble at the coverage level N in a ramping manner, and a difference lies in that a quantity of repetition times corresponding to the coverage level N+1 is greater than a quantity of repetition times corresponding to the coverage level N. To avoid repetition, details are not described herein again.

Optionally, in another embodiment, after the terminal device switches from the current coverage level to the next level, the terminal device sends the preamble in a power ramping manner by using a quantity of repetition times corresponding to the next coverage level and the current power ramp step corresponding to the current coverage level.

Specifically, when the terminal device has performed coverage level switching for random access, for example, switched from a coverage level N to a coverage level N+1 (N=0 or N=1), the terminal device sends the preamble still in a previous power control manner (that is, a power control manner at the coverage level N), but sends the preamble by using a quantity of repetition times at the coverage level N+1.

Therefore, in this embodiment of this application, during level switching, the terminal device still sends the preamble by using power determined in a power ramping manner, and a prior-art manner of directly sending a preamble by using maximum power is abandoned. This can reduce impact on another terminal device. In addition, after the level switching, although the transmit power is determined in a previous power control manner, the preamble is sent based on the quantity of repetition times corresponding to the next coverage level, so that a quantity of repetition times of the preamble during each transmission can be increased, thereby improving an access success probability.

After step 320, the terminal device and the network device may perform a subsequent random access procedure in the existing manner.

Figure 4:
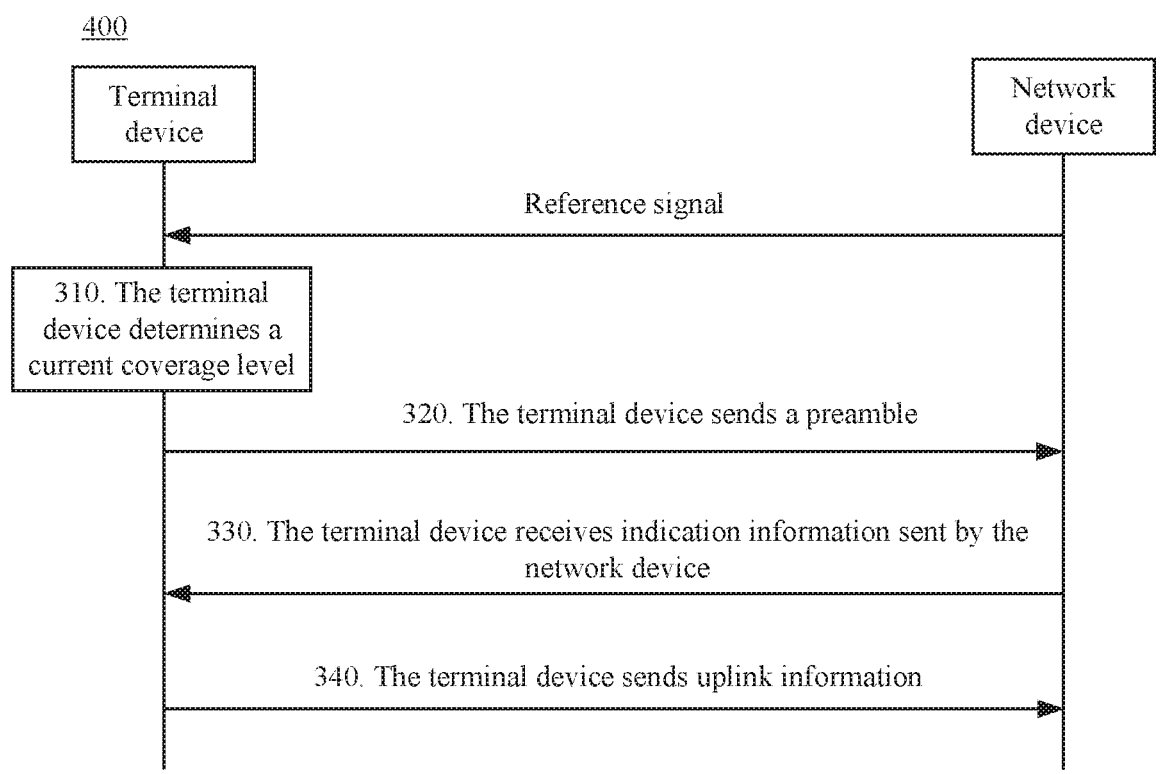
FIG. 4 is a schematic flowchart of a communication method according to another embodiment of this application.

Optionally, in another embodiment, as shown in FIG. 4, after step 320, a method 400 in this embodiment of this application may further include the following steps.

330. The terminal device receives indication information sent by the network device.

Specifically, the indication information is used to indicate a quantity of repetition times of sending uplink information by the terminal device. The quantity of repetition times of sending the uplink information may be a quantity of times the uplink information is repeated when the terminal device sends the uplink information each time. To be specific, content sent each time is repetition of the uplink information and is repeated for N times.

It should be understood that the network device may add the indication information to an RAR in the random access procedure. Correspondingly, the uplink information is a Message 3.

Alternatively, the network device may add the indication information to an uplink grant (uplink grant. UL grant) obtained after random access is completed. Correspondingly, the uplink information may be uplink data.

340. The terminal device sends uplink information.

Specifically, when the terminal device determines that the quantity of repetition times is greater than a second threshold, the terminal device sends the uplink information by using maximum transmit power; or when the terminal device determines that the quantity of repetition times is less than or equal to the second threshold, the terminal device sends the uplink information by using first power, where the first power is determined by the terminal device based on at least one of a path loss, a path loss compensation factor, or transmission bandwidth.

Corresponding to step 330, the uplink information may be a Message 3 or may be uplink data.

It should be understood that, in this embodiment of this application, the second threshold may be preset, may be indicated by the RAR, may be configured by using a system message, or may be indicated by an uplink grant message. This embodiment of this application is not limited thereto.

It should be understood that the second threshold in this embodiment of this application may be an integer greater than 2.

Specifically, when the terminal device switches from a coverage level N to a coverage level N+1 to send the preamble, after receiving an RAR, the terminal device may send a Message 3 based on an indication of the RAR Because the network device has received the preamble on a resource corresponding to the coverage level N+1, the network device considers that the terminal device is at the coverage level N+1 at this time, and a configured quantity of repetition times of the Message 3 may be relatively large and is, for example, greater than 2. In this case, according to stipulations in an existing standard, when the quantity of repetition times is greater than 2, the terminal device sends the Message 3 by using maximum power. However, the terminal device may be relatively close to the network device, and if the Message 3 is sent by using the maximum power, a noise floor of the network device increases, causing interference to another terminal device and affecting network performance. In contrast, in this embodiment of this application, because the specified second threshold is greater than 2, even if a quantity of repetition times configured by the network device for the Message 3 is greater than 2, the terminal device may send the Message 3 by using, for example, the first power instead of the maximum power, provided that the quantity of repetition times is less than the second threshold, so as to reduce a noise floor of the network device and reduce impact on another terminal device, thereby improving network performance.

For a method for determining the first power, refer to a method of determining, when a quantity of repetition times of the Message 3 in an existing standard is 1, power for sending the Message 3. Details are not described herein.

Figure 5:
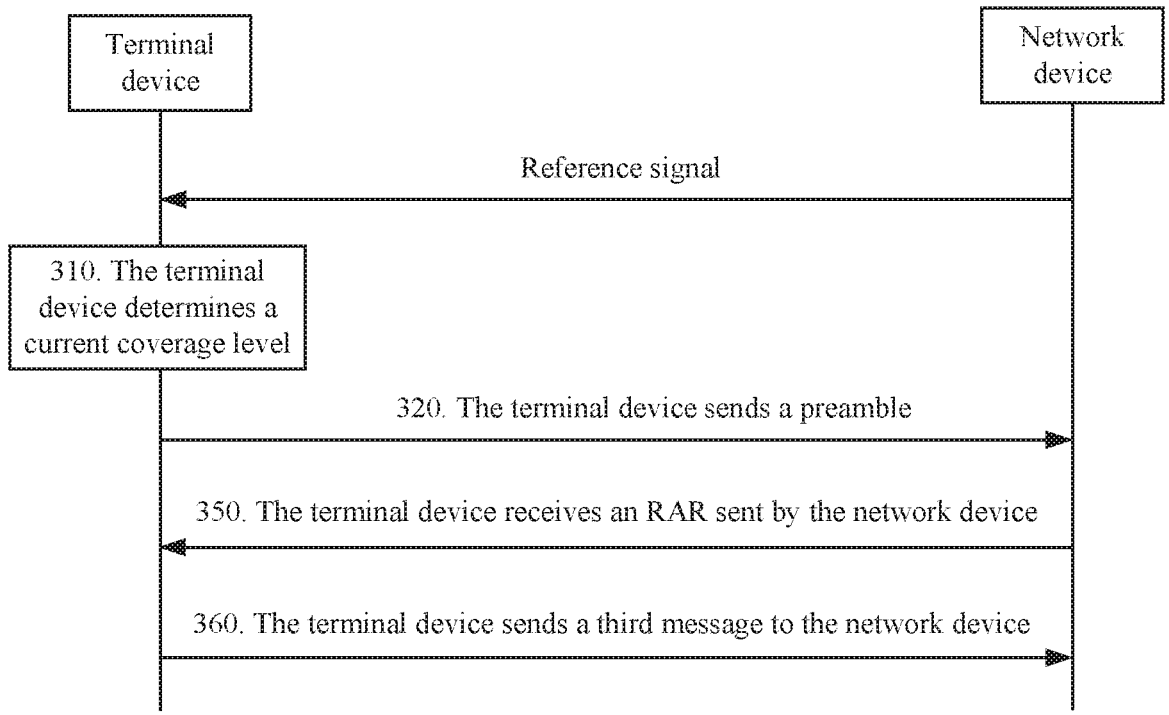
FIG. 5 is a schematic flowchart of data transmission according to another embodiment of this application.

Alternatively, in another embodiment, as shown in FIG. 5, after step 320, a method 500 in this embodiment of this application may further include the following steps.

350. The terminal device receives an RAR sent by the network device.

Optionally, the RAR message may include configuration information, where the configuration information indicates downlink channel quality indication information sent by the terminal device to the network device, and the downlink channel quality indication information is used to indicate downlink channel quality.

Optionally, in another embodiment, the configuration information may not be carried in the RAR, for example, may be carried in a system message. Alternatively, it is preconfigured in a system for the terminal device to feed back the downlink channel quality indication information.

360. The terminal device sends a Message 3 to the network device.

The Message 3 carries the downlink channel quality indication information.

Correspondingly, the network device receives the Message 3, and obtains the downlink channel quality indication information. Then, the network device may determine a maximum quantity of repetition times of sending a Message 4 and/or a maximum (Rmax) value of a USS of the terminal device based on the downlink channel quality. The maximum value of the USS indicates a maximum quantity of repetition times of an NPDCCH in the UE-specific search space of the terminal device.

The downlink channel quality indication information may include reference signal received quality (RSRQ), or a quantity of NPDCCH repetition times during RAR demodulation by the terminal device.

Specifically, when the network device receives the downlink channel quality indication information, the network device can properly select, based on the downlink channel quality, the maximum quantity of repetition times of sending the Message 4. In addition, in an RRC connection establishment process, the network device properly configures the maximum value of the USS based on the downlink channel quality.

Specifically, currently in NB-IoT, a specific coverage level is determined after the terminal device compares a downlink RSRP measurement value with an RSRP threshold preconfigured by the network device. The RSRP threshold is set in consideration of ensuring, as much as possible, receiving performance of a preamble on an uplink PRACH by the network device. However, in actual network deployment, there is a difference between an uplink receiving interference level of the network device and an interference level of a downlink terminal. In addition, because specific locations of terminals having a same RSRP are different, there may also be a great difference between downlink receiving SNRs of the terminals. Therefore, the network device, that is, a base station, usually set, based on receiving performance of the uplink PRACH, the RSRP threshold used for determining a coverage level. Although the coverage level selected based on the RSRP threshold reflects an uplink receiving status relatively accurately, it is quite difficult to reflect a downlink SNR of the terminal. In this case, the network device, that is, the base station, actually cannot accurately learn a downlink coverage status of the terminal, and can only configure a relatively conservative maximum quantity of repetition times of an NPDCCH search space or relatively conservatively schedule downlink data. Consequently, the specified quantity of repetition times of the search space is excessively large, or a quantity of repetition times of the downlink data is relatively large. This results in relatively high power consumption of the terminal and a system resource waste, thereby affecting network performance.

In contrast, in this embodiment of this application, the terminal device reports the downlink channel quality, so that the network device can properly determine the maximum quantity of repetition times of sending the Message 4 and/or the maximum value of the USS of the terminal device based on the downlink channel quality. This resolves an existing problem and avoids excessive power consumption of the terminal device and a system resource waste, thereby improving network performance.

The foregoing describes the communication method performed by the terminal device in a power ramping manner with reference to FIG. 3 to FIG. 5.

Figure 6:
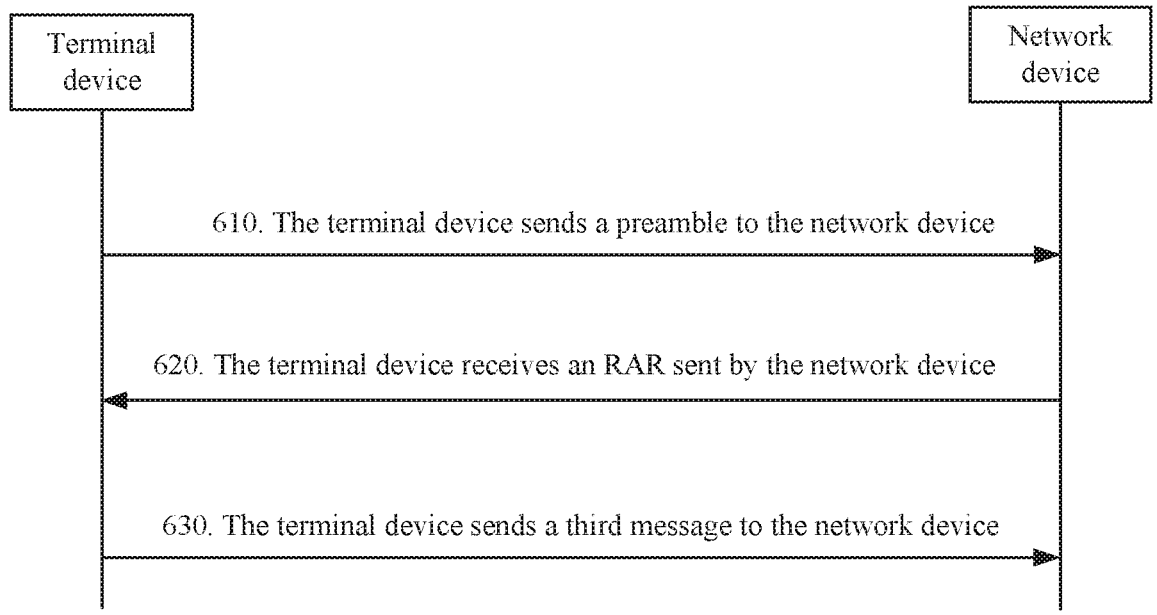
FIG. 6 is a schematic flowchart of a communication method according to another embodiment of this application.

FIG. 6 is a schematic flowchart of a communication method according to an embodiment of this application. In the method in FIG. 6, a solution of reporting downlink channel quality by a terminal device can be added based on the existing solution in FIG. 2, so that a network device properly performs downlink transmission. Specifically, the method 600 shown in FIG. 6 includes the following steps.

610. The terminal device sends a preamble to the network device.

Specifically, the terminal device may send the preamble in an existing manner or in the manner in step 320. To avoid repetition, details are not described herein again.

620. The terminal device receives an RAR sent by the network device.

Optionally, step 620 is corresponding to step 350. To avoid repetition, details are not described herein again.

630. The terminal device sends a Message 3 to the network device.

Optionally, step 630 is corresponding to step 360. To avoid repetition, details are not described herein again.

Therefore, in this embodiment of this application, the terminal device reports downlink channel quality, so that the network device can properly determine a maximum quantity of repetition times of sending a Message 4 and/or a maximum value of a USS of the terminal device based on the downlink channel quality. This resolves an existing problem and avoids excessive power consumption of the terminal device and a system resource waste, thereby improving network performance.

Figure 7:
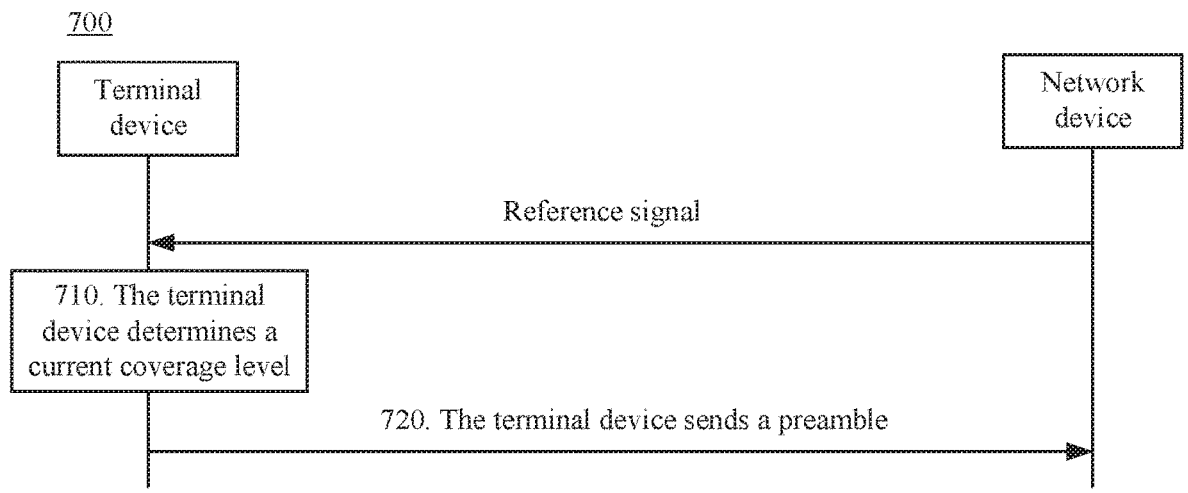
FIG. 7 is a schematic flowchart of a communication method according to another embodiment of this application.

FIG. 7 is a schematic flowchart of a communication method according to an embodiment of this application. In the method in FIG. 7, a solution of determining a current coverage level can be improved based on an existing solution. Specifically, the method 700 shown in FIG. 7 includes the following steps.

710. A terminal device determines a current coverage level.

Specifically, the terminal device determines the current coverage level based on reference signal receiving performance.

Specifically, optionally, the terminal device may determine the current coverage level from at least two coverage levels based on the reference signal receiving performance.

The reference signal receiving performance may include a signal-to-noise ratio (SNR) of a reference signal or reference signal received quality. For example, the terminal device may compare current receiving performance with a receiving performance threshold, to determine the current coverage level. The receiving performance threshold may be carried in a system message, or may be preset by a system. This embodiment of this application is not limited thereto. For example, the reference signal receiving performance threshold may include two thresholds: a performance threshold 1 and a performance threshold 2, where the performance threshold 1 is less than the performance threshold 2. The terminal device compares a value of the reference signal receiving performance with the two performance thresholds, to determine the current coverage level. For example, when the value of the receiving performance is less than the performance threshold 1, it is determined that the current coverage level is a coverage level 2; when the value of the receiving performance is greater than the performance threshold 2, it is determined that the current coverage level is a coverage level 0; or when the value of the receiving performance is between the performance threshold 1 and the performance threshold 2, it is determined that the current coverage level is a coverage level 1.

Optionally, the terminal device may alternatively determine the coverage level based on reference signal received power and the reference signal receiving performance.

Specifically, the terminal device determines an initial coverage level based on the reference signal received power; and when the initial coverage level does not match the reference signal receiving performance, the terminal device determines a coverage level corresponding to the reference signal receiving performance as the current coverage level.

It should be understood that each coverage level in this embodiment of this application may be corresponding to a reference signal receiving performance range. The terminal device may first determine an initial coverage level based on the reference signal received power. When the initial coverage level matches the reference signal receiving performance, that is, when the reference signal receiving performance falls within a reference signal receiving performance range corresponding to the initial coverage level, the terminal device determines the initial coverage level as the current coverage level. When the initial coverage level does not match the reference signal receiving performance, that is, when the reference signal receiving performance is beyond the reference signal receiving performance range corresponding to the initial coverage level, the terminal device determines the coverage level corresponding to the reference signal receiving performance as the current coverage level.

For example, if RSRP measured by the terminal device at the beginning is at a coverage level N, but an SNR obtained through measurement is undesirable and is lower than an SNR at the current coverage level, the terminal device directly sends a preamble at a coverage level N+1 or a coverage level N+2 corresponding to the reference signal receiving performance.

For example, when the reference signal received power is corresponding to the coverage level N, and the reference signal receiving performance is corresponding to the coverage level N+1, the terminal device determines that the current coverage level is the coverage level N+1; or when the reference signal received power is corresponding to the coverage level N, and the reference signal receiving performance is corresponding to the coverage level N+2, the terminal device determines that the current coverage level is the coverage level N+2.

It should be understood that, in this embodiment of this application, a next coverage level of the coverage level 0 is the coverage level 1, a next coverage level of the coverage level 1 is the coverage level 2, and so on. The coverage level 0 indicates best channel quality. As a coverage level increases, channel quality gradually deteriorates.

Specifically, in the prior art, a coverage level is determined based only on reference signal received power. In this case, reference signal receiving performance may be relatively poor although the reference signal received power is relatively high. If the coverage level is determined based only on the reference signal received power, a current channel status of the terminal device cannot be well reflected. Therefore, in this embodiment of this application, the terminal device may determine the current coverage level based on the reference signal receiving performance, so that the current coverage level can be flexibly and accurately determined, improving network performance.

720. The terminal device sends a preamble.

Optionally, step 720 is corresponding to step 320. To avoid repetition, details are not described herein again.

Therefore, in this embodiment of this application, the terminal device may determine the current coverage level based on the reference signal receiving performance, so that the current coverage level can be flexibly and accurately determined, improving network performance.

Figure 8:
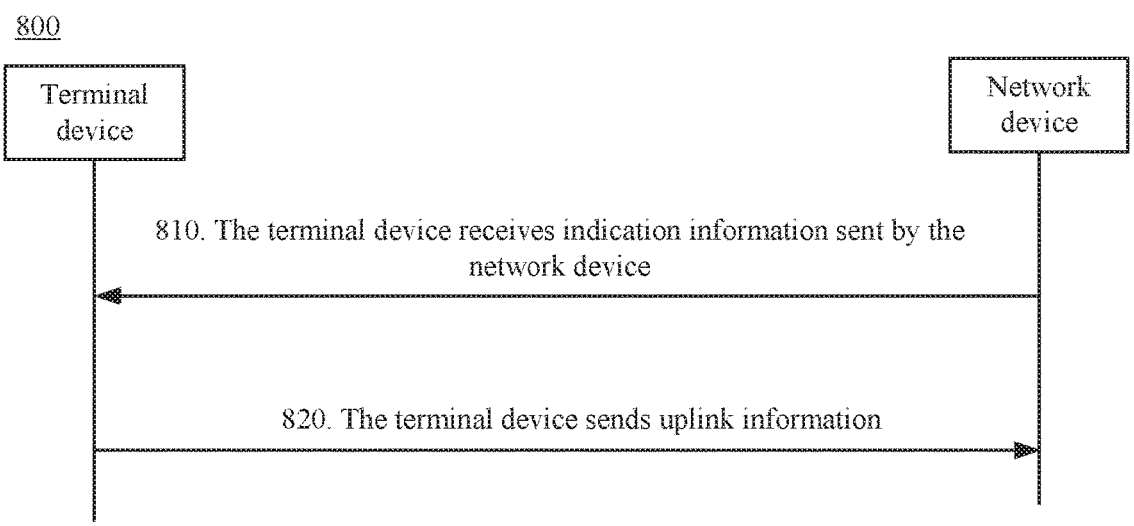
FIG. 8 is a schematic flowchart of a communication method according to another embodiment of this application.

FIG. 8 is a schematic flowchart of a communication method according to an embodiment of this application. In the method in FIG. 8, a solution of sending uplink information can be improved based on an existing solution. Specifically, the method 800 shown in FIG. 8 includes the following steps.

810. A terminal device receives indication information sent by a network device.

Optionally, step 810 is corresponding to step 330. To avoid repetition, details are not described herein again.

820. The terminal device sends uplink information.

Therefore, in this embodiment of this application, because a specified second threshold is greater than 2, even if a quantity of repetition times configured by the network device for a Message 3 is greater than 2, the terminal device may send the Message 3 by using, for example, first power instead of maximum power, provided that the quantity of repetition times is less than the second threshold, so as to effectively reduce a noise floor of the network device and reduce impact on another terminal device, thereby improving network performance.

It should be noted that, the communication method in each of the foregoing embodiments may further include: when the terminal device detects that a coverage level corresponding to downlink channel quality does not match a current coverage level, re-initiating, by the terminal device, a random access procedure at the coverage level corresponding to the downlink channel quality. Specifically, after the terminal device completes a random access procedure, that is, when the terminal device performs data transmission with the network device, if the terminal device detects that the coverage level corresponding to the downlink channel quality does not match the current coverage level, the terminal device re-initiates the random access procedure based on the coverage level corresponding to the downlink channel quality, and then performs data transmission after the re-initiated random access procedure is completed.

It should be understood that, for the specific re-initiated random access procedure, reference may be made to the descriptions of the foregoing embodiments. Details are not described herein again.

For example, when downlink channel quality deteriorates so that the downlink channel quality does not match a coverage level, if communication is performed still based on a parameter corresponding to the original coverage level, it is possible that the terminal device cannot obtain downlink data, thereby affecting network performance. In contrast, in this embodiment of this application, in such a case, random access is re-initiated, so that the downlink channel quality matches the coverage level. This resolves the foregoing problem and can improve network performance.

It should be noted that, in each of the foregoing embodiments, when a quantity of times of failing in sending a preamble by the terminal device at the current coverage level is greater than a first threshold or a maximum quantity of times of transmitting a preamble at the current coverage level, the terminal device needs to switch to a next coverage level to send the preamble. In a case of coverage level switching, the terminal device may further send switching indication information by using the Message 3, where the switching indication information is used to indicate whether the terminal device has performed coverage level switching. For example, the switching indication information is 1 bit in length; and when the indication information is set to 0, it indicates that no coverage level switching has been performed; or when the indication information is set to 1, it indicates that the terminal device has performed coverage level switching. Alternatively, when the switching indication information is set to 1, it indicates that the terminal has not performed coverage level switching; or when the switching indication information is set to 0, it indicates that the terminal device has performed coverage level switching. In this way, after obtaining the Message 3, the network device may determine, based on a value of the switching indication information, whether the terminal device has performed coverage level switching. When the terminal device has performed coverage level switching (for example, the terminal device has switched from a coverage level 0 to a coverage level 1), although the terminal device sends the preamble at the coverage level 1, because the terminal device may be relatively close to the network device and the downlink channel quality may be desirable, the network device may not need to configure, based on the coverage level 1, a quantity of repetition times of sending a Message 4 and a maximum value of a USS. The network device can flexibly select a maximum quantity of repetition times of sending the Message 4, and in an RRC connection establishment process, the network device can properly configure the maximum value of the USS. For example, when the indication information indicates that the terminal device has performed coverage level switching, a quantity of repetition times of actually sending a Message 4 by the network device may be less than the quantity of repetition times of the Message 4 corresponding to the coverage level 1, and a maximum value of the USS configured by the network device is less than the maximum value of the USS corresponding to the coverage level 1. In this way, excessive consumption of the terminal device and a system resource waste can be avoided.

Therefore, in this embodiment of this application, the terminal device reports the switching indication information, so that the network device can properly determine the maximum quantity of repetition times of sending the Message 4 and/or the maximum value of the USS of the terminal device based on the switching indication information. This avoids excessive power consumption of the terminal device and a system resource waste, thereby improving network performance.

It should be noted that each of the foregoing embodiments of this application may be targeted for each release (release) of the 3rd Generation Partnership Project (3rd generation partnership project, 3GPP). In other words, a terminal device in each release (such as a release 13, a release 14, or a release 15) of the 3GPP may perform communication according to the foregoing embodiments.

Optionally, each of the foregoing embodiments may be targeted for a terminal device only in a new release (for example, the release 15). For example, the network device may send a system message in a preset manner, so that only a terminal device in the release 15 can correctly decode a coverage level threshold in the system message, and a terminal device in an old release (such as the release 13 or the release 14) cannot obtain the coverage level threshold. The terminal device in the old release can receive only a coverage level threshold in a system message in the old release. During configuration of a quantity of coverage levels, a quantity of old-release coverage levels and a quantity of new-release coverage levels may be separately configured. In this case, the terminal device in the new release may perform random access in a manner according to each of the foregoing embodiments in this specification, whereas the terminal device in the old release may be separately configured to have no coverage level threshold. Therefore, it is considered that all terminal devices in the old release have only one coverage level, that is, a coverage level 0, and all the terminal devices in the old release perform random access at the existing coverage level 0 in a power ramping manner. In such a manner, the method in this embodiment of this application is compatible with a terminal device in the old release (such as the release 13 or the release 14). In other words, this embodiment of this application is compatible with stipulations in an existing protocol, so that all terminal devices in the old release perform random access in a power ramping manner corresponding to the coverage level 0 in the existing protocol. This avoids a problem of an increase in a noise floor of a receiver of the network device that is caused by coverage level switching by the terminal device in the old release. In addition, the terminal device in the new release can perform coverage level switching, so that the problem of the increase in the noise floor of the receiver of the network device is resolved by using the method in this embodiment of the present invention.

It should be noted that, the examples in the foregoing embodiments are merely intended to help a person skilled in the art understand the embodiments of this application, but not to limit the embodiments of this application to specific values or specific scenarios shown in the examples. Apparently, a person skilled in the art can make various equivalent modifications or changes to the examples provided above. For example, each of the foregoing embodiments of this application may be combined or embedded. The foregoing modifications or changes also fall within the scope of the embodiments of this application.

The foregoing details the communication methods according to the embodiments of this application with reference to FIG. 1 to FIG. 8, and the following details devices according to the embodiments of this application with reference to FIG. 9 to FIG. 12.

Figure 9:
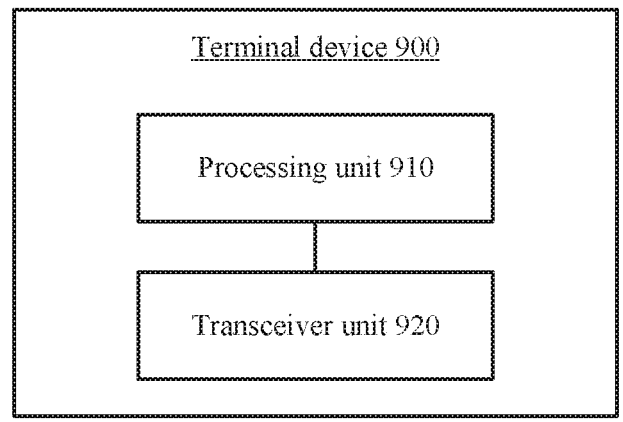
FIG. 9 is a schematic block diagram of a terminal device according to an embodiment of this application.

FIG. 9 is a schematic block diagram of a terminal device 900 according to an embodiment of this application. Specifically, as shown in FIG. 9, the terminal device 900 includes a processing unit 910 and a transceiver unit 920.

Specifically, the processing unit is configured to determine a current coverage level from at least two coverage levels based on reference signal received power, where each of the at least two coverage levels is corresponding to a power ramp step; and the transceiver unit is configured to send, to a network device in a power ramping manner based on a current power ramp step corresponding to the current coverage level, a random access preamble.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

Optionally, in another embodiment, the transceiver unit is specifically configured to: when failing in sending the preamble last time, increase transmit power of the preamble by the current power ramp step, to obtain new power; and resend the preamble by using the new power.

Optionally, in another embodiment, the transceiver unit is further configured to: when a quantity of times of sending the preamble at the current coverage level is greater than a first threshold, send the preamble to the network device at a next coverage level of the current coverage level, where the first threshold is less than a maximum quantity of times of transmitting a preamble at the current coverage level.

Optionally, in another embodiment, the transceiver unit is specifically configured to send the preamble in a power ramping manner by using a quantity of repetition times corresponding to the next coverage level and the current power ramp step corresponding to the current coverage level.

The processing unit is specifically configured to determine the current coverage level from the at least two coverage levels based on reference signal receiving performance.

Optionally, in another embodiment, the processing unit is specifically configured to determine the current coverage level from the at least two coverage levels based on reference signal received power and the reference signal receiving performance.

Optionally, in another embodiment, the processing unit is specifically configured to: determine an initial coverage level based on the reference signal received power: and when the initial coverage level does not match the reference signal receiving performance, determine a coverage level corresponding to the reference signal receiving performance as the current coverage level.

Optionally, in another embodiment, the transceiver unit is further configured to: receive indication information sent by the network device, where the indication information is used to indicate a quantity of repetition times of sending uplink information by the terminal device; and when it is determined that the quantity of repetition times is greater than a second threshold, send the uplink information by using maximum transmit power: or when it is determined that the quantity of repetition times is less than or equal to the second threshold, send the uplink information by using first power, where the first power is determined by the terminal device based on at least one of a path loss, a path loss compensation factor, or transmission bandwidth.

Optionally, in another embodiment, the indication information is carried in an uplink grant UL grant, and the uplink information is uplink data; or the indication information is carried in a random access response RAR, and the uplink information is a Message 3.

Optionally, in another embodiment, the second threshold is preset, the second threshold is indicated by the RAR, or the second threshold is configured by using a system message.

Optionally, in another embodiment, the transmit power of the preamble is determined based on target received power of the preamble and a path loss between the terminal device and the network device, and the target received power of the preamble is related to the power ramp step and a current quantity of times of sending the preamble.

Optionally, in another embodiment, the transmit power of the preamble is determined by the transceiver unit according to the following formula:

$$P_{NPRACH} = \min\{P_{CMAX}, P_{TARGET} + PL\} \text{ [dBm], where}$$

$P_{NPRACH}$ represents the transmit power of the preamble, $P_{CMAX}$ represents the maximum transmit power of the terminal device, $P_{TARGET}$ represents the target received power of the preamble, and PL represents the path loss, where $$P_{TARGET} = P_P + (M-1)P_S, \text{ where}$$

$P_P$ represents initial target received power of the preamble, M represents the current quantity of sending times, and $P_S$ represents the current power ramp step: or $$P_{TARGET}=P_P+(M-1)P_S-10\times\log_{10} N_r, \text{ where}$$

$N_r$ is a quantity of repetition times of sending the preamble.

Optionally, in another embodiment, the transceiver unit is further configured to: when the terminal device detects that a coverage level corresponding to downlink channel quality does not match the current coverage level, re-initiate a random access procedure at the coverage level corresponding to the downlink channel quality. This process may be performed after a random access procedure is completed.

Optionally, in another embodiment, the transceiver unit is further configured to send downlink channel quality indication information to the network device, where the downlink channel quality indication information is carried in a Message 3 sent by the terminal device, and the downlink channel quality indication information is used to indicate downlink channel quality.

Optionally, in another embodiment, the transceiver unit is specifically configured to send the downlink channel quality indication information to the network device based on an indication of configuration information, where the configuration information is carried in an RAR sent by the network device, or the configuration information is carried in a system message.

Optionally, in another embodiment, the downlink channel quality indication information includes reference signal received quality RSRQ, or a quantity of NPDCCH repetition times during RAR demodulation by the terminal device.

Therefore, in this embodiment of this application, during level switching, the terminal device still sends the preamble by using power determined in a power ramping manner, and a prior-art manner of directly sending a preamble by using maximum power is abandoned. This can reduce impact on another terminal device. In addition, after the level switching, a quantity of repetition times of a preamble during each transmission is increased, thereby improving an access success probability.

Alternatively, the processing unit 910 and the transceiver unit 920 in the terminal device 900 can further implement the following functions:

the processing unit is configured to control the transceiver unit to: send, to a network device, a random access preamble;

receive a random access response RAR sent by the network device, where the RAR indicates a first resource; and send downlink channel quality indication information to the network device, where the downlink channel quality indication information is carried in a Message 3 that is sent by the terminal device by using the first resource, and the downlink channel quality indication information is used to indicate downlink channel quality.

Optionally, in another embodiment, the transceiver unit is specifically configured to send the downlink channel quality indication information to the network device based on configuration information, where the configuration information is carried in the RAR sent by the network device, or the configuration information is carried in a system message.

Optionally, in another embodiment, the downlink channel quality indication information includes reference signal received quality RSRQ, or a quantity of NPDCCH repetition times during RAR demodulation by the terminal device.

Therefore, in this embodiment of this application, the terminal device reports the downlink channel quality, so that the network device can properly determine a maximum quantity of repetition times of sending a Message 4 and/or a maximum value of a USS of the terminal device based on the downlink channel quality. This resolves an existing problem and avoids excessive power consumption of the terminal device and a system resource waste, thereby improving network performance.

Alternatively, the processing unit 910 and the transceiver unit 920 in the terminal device 900 can further implement the following functions:

the processing unit is configured to determine a current coverage level based on reference signal receiving performance: and the transceiver unit is configured to perform random access at the current coverage level.

Optionally, in another embodiment, the processing unit is specifically configured to determine the current coverage level based on the reference signal receiving performance and reference signal received power.

Optionally, in another embodiment, the processing unit is specifically configured to: determine an initial coverage level based on the reference signal received power; and when the initial coverage level does not match the reference signal receiving performance, determine a coverage level corresponding to the reference signal receiving performance as the current coverage level.

Optionally, in another embodiment, the transceiver unit is specifically configured to send, to the network device, a random access preamble, where transmit power of the preamble is determined based on target received power of the preamble and a path loss between the terminal device and the network device, and the target received power of the preamble is related to a current power ramp step and a current quantity of times of sending the preamble by the terminal device.

Optionally, in another embodiment, the transmit power of the preamble is determined according to the following formula:

$$P_{NPRACH}=\min\{P_{CMAX},P_{TARGET}+PL\} \text{ [dBm], where}$$

$P_{NPRACH}$ represents the transmit power of the preamble. $P_{CMAX}$ represents maximum transmit power of the terminal device, $P_{TARGET}$ represents the target received power of the preamble, and PL represents the path loss, where $$P_{TARGET}=P_P+(M-1)P_S, \text{ where}$$

$P_P$ represents initial target received power of the preamble, M represents the current quantity of sending times, and $P_S$ represents the power ramp step: or $$P_{TARGET}=P_P+(M-1)P_S-10\times\log_{10} N_r, \text{ where}$$

$N_r$ is a quantity of repetition times of sending the preamble.

Therefore, in this embodiment of this application, the terminal device may determine the current coverage level based on the reference signal receiving performance, so that the current coverage level can be flexibly and accurately determined, improving network performance.

Alternatively, the processing unit 910 and the transceiver unit 920 in the terminal device 900 can further implement the following functions:

the terminal device receives indication information sent by a network device, where the indication information is used to indicate a quantity of repetition times of sending uplink information by the terminal device; and when the terminal device determines that the quantity of repetition times is greater than a second threshold, the terminal device sends the uplink information by using maximum transmit power; or when the terminal device determines that the quantity of repetition times is less than or equal to the second threshold, the terminal device sends the uplink information by using first power, where the first power is determined by the terminal device based on at least one of a path loss, a path loss compensation factor, or transmission bandwidth.

Optionally, in another embodiment, the indication information is carried in an uplink grant UL grant, and the uplink information is uplink data; or the indication information is carried in a random access response RAR, and the uplink information is a Message 3.

Optionally, in another embodiment, the second threshold is preset, the second threshold is indicated by the RAR, or the second threshold is configured by using a system message.

Therefore, in this embodiment of this application, because the specified second threshold is greater than 2, even if a quantity of repetition times configured by the network device for the Message 3 is greater than 2, the terminal device may send the Message 3 by using, for example, the first power instead of the maximum power, provided that the quantity of repetition times is less than the second threshold, so as to reduce a noise floor of the network device and reduce impact on another terminal device, thereby improving network performance.

It should be understood that the terminal device 900 shown in FIG. 9 can implement the processes corresponding to the terminal device in the method embodiments in FIG. 1 to FIG. 9. Operations and/or functions of each module in the terminal device are intended to implement respective corresponding procedures in the method embodiments in FIG. 1 to FIG. 9. For details, refer to descriptions in the method embodiments. To avoid repetition, detailed descriptions are omitted as appropriate herein.

Figure 10:
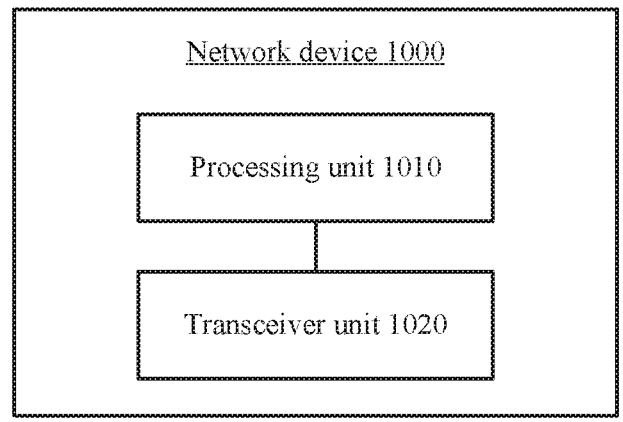
FIG. 10 is a schematic block diagram of a network device according to an embodiment of this application.

FIG. 10 is a schematic block diagram of a network device 1000 according to an embodiment of this application. Specifically, as shown in FIG. 10, the network device 1000 includes a processing unit 1010 and a transceiver unit 1020.

Specifically, the processing unit is configured to control the transceiver unit to: send a reference signal to a terminal device, so that the terminal device determines a current coverage level from at least two coverage levels based on reference signal received power, where each of the at least two coverage levels is corresponding to a power ramp step; and receive a random access preamble, where the preamble is sent by the terminal device in a power ramping manner based on a current power ramp step corresponding to the current coverage level.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

Optionally, in another embodiment, the transceiver unit is further configured to: send indication information to the terminal device, where the indication information is used to indicate a quantity of repetition times of sending uplink information by the terminal device; and receive the uplink information, where when the quantity of repetition times is greater than a second threshold, the uplink information is sent by the terminal device by using maximum transmit power; or when the quantity of repetition times is less than or equal to the second threshold, the uplink information is sent by the terminal device by using first power, where the first power is determined by the terminal device based on at least one of a path loss, a path loss compensation factor, or transmission bandwidth.

Optionally, in another embodiment, the indication information is carried in an uplink grant UL grant, and the uplink information is uplink data; or the indication information is carried in a random access response RAR, and the uplink information is a Message 3.

Optionally, in another embodiment, the second threshold is preset, the second threshold is indicated by the RAR, or the second threshold is configured by using a system message.

Optionally, in another embodiment, the transceiver unit is further configured to receive downlink channel quality indication information sent by the terminal device, where the downlink channel quality indication information is carried in a Message 3 that is sent by the terminal device and that is received by the network device, and the downlink channel quality indication information is used to indicate downlink channel quality; and the processing unit is further configured to determine a maximum quantity of repetition times of sending a Message 4 and/or a maximum value of a USS of the terminal device based on the downlink channel quality.

Optionally, in another embodiment, the downlink channel quality indication information is sent by the terminal device based on an indication of configuration information, where the configuration information is carried in an RAR sent by the transceiver unit, or the configuration information is carried in a system message.

Optionally, in another embodiment, the downlink channel quality indication information includes reference signal received quality RSRQ, or a quantity of NPDCCH repetition times during RAR demodulation by the terminal device.

Alternatively, the processing unit 1010 and the transceiver unit 1020 in the network device 1000 can further implement the following functions:

the transceiver unit is configured to: receive a random access preamble sent by a terminal device;

send a random access response RAR to the terminal device, where the RAR indicates a first resource; and receive downlink channel quality indication information sent by the terminal device, where the downlink channel quality indication information is carried in a Message 3 that is sent by the terminal device by using the first resource, and the downlink channel quality indication information is used to indicate downlink channel quality; and the processing unit is configured to determine a maximum quantity of repetition times of sending a Message 4 and/or a maximum value of a USS of the terminal device based on the downlink channel quality.

Optionally, in another embodiment, the downlink channel quality indication information is sent by the terminal device based on an indication of configuration information, where the configuration information is carried in the RAR sent by the transceiver unit, or the configuration information is carried in a system message.

Optionally, in another embodiment, the downlink channel quality indication information includes reference signal received quality RSRQ, or a quantity of NPDCCH repetition times during RAR demodulation by the terminal device.

Therefore, in this embodiment of this application, the terminal device reports the downlink channel quality, so that the network device can properly determine the maximum quantity of repetition times of sending the Message 4 and/or the maximum value of the USS of the terminal device based on the downlink channel quality. This resolves an existing problem and avoids excessive power consumption of the terminal device and a system resource waste, thereby improving network performance.

Alternatively, the processing unit 1010 and the transceiver unit 1020 in the network device 1000 can further implement the following functions:

the processing unit is configured to control the transceiver unit to: send indication information to a terminal device, where the indication information is used to indicate a quantity of repetition times of sending uplink information by the terminal device; and receive the uplink information, where when the quantity of repetition times is greater than a second threshold, the uplink information is sent by the terminal device by using maximum transmit power: or when the quantity of repetition times is less than or equal to the second threshold, the uplink information is sent by the terminal device by using first power, where the first power is determined by the terminal device based on at least one of a path loss, a path loss compensation factor, or transmission bandwidth.

Optionally, in another embodiment, the indication information is carried in an uplink grant UL grant, and the uplink information is uplink data; or the indication information is carried in a random access response RAR, and the uplink information is a Message 3.

Optionally, in another embodiment, the second threshold is preset, the second threshold is indicated by the RAR, or the second threshold is configured by using a system message.

Therefore, in this embodiment of this application, because the specified second threshold is greater than 2, even if a quantity of repetition times configured by the network device for the Message 3 is greater than 2, the terminal device may send the Message 3 by using, for example, the first power instead of the maximum power, provided that the quantity of repetition times is less than the second threshold, so as to reduce a noise floor of the network device and reduce impact on another terminal device, thereby improving network performance.

It should be understood that the network device 1000 shown in FIG. 10 can implement the processes corresponding to the network device in the method embodiments in FIG. 1 to FIG. 9. Operations and/or functions of each module in the network device are intended to implement respective corresponding procedures in the method embodiments in FIG. 1 to FIG. 9. For details, refer to descriptions in the method embodiments. To avoid repetition, detailed descriptions are omitted as appropriate herein.

Figure 11:
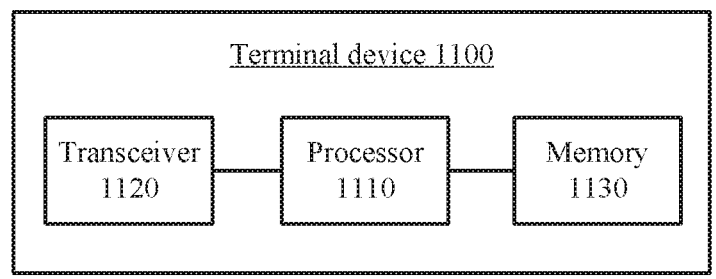
FIG. 11 is a schematic block diagram of a terminal device according to another embodiment of this application.

FIG. 11 is a schematic block diagram of a terminal device 1100 according to an embodiment of this application. Specifically, as shown in FIG. 11, the terminal device 1100 includes a processor 1110 and a transceiver 1120, where the processor 1110 is connected to the transceiver 1120. Optionally, the terminal device 1100 further includes a memory 1130, there the memory 1130 is connected to the processor 1110. The processor 1110, the memory 1130, and the transceiver 1120 communicate with each other by using an internal connection path, to transfer a control signal and/or a data signal. The memory 1130 may be configured to store an instruction. The processor 1110 is configured to: execute the instruction stored in the memory 1130, and control the transceiver 1120 to receive and send information or signals. The processor 1110 executes the instruction in the memory 1130, so that the processes corresponding to the terminal device in the method embodiments in FIG. 1 to FIG. 8 can be completed. To avoid repetition, details are not described herein again.

It should be understood that, the terminal device 1100 may be corresponding to the terminal device 900 in FIG. 9, functions of the processing unit 910 in the terminal device 900 may be implemented by the processor 1110, and functions of the transceiver unit 920 may be implemented by the transceiver 1120.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

Figure 12:
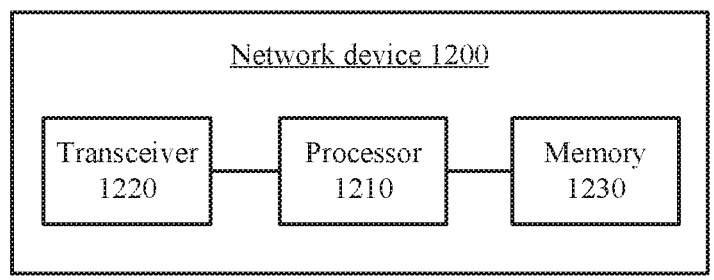
FIG. 12 is a schematic block diagram of a network device according to another embodiment of this application.

FIG. 12 is a schematic block diagram of a network device 1200 according to an embodiment of this application. Specifically, as shown in FIG. 12, the network device 1200 includes a processor 1210 and a transceiver 1220, where the processor 1210 is connected to the transceiver 1220. Optionally, the network device 1200 further includes a memory 1230, where the memory 1230 is connected to the processor 1210. The processor 1210, the memory 1230, and the transceiver 1220 communicate with each other by using an internal connection path, to transfer a control signal and/or a data signal. The memory 1230 may be configured to store an instruction. The processor 1210 is configured to: execute the instruction stored in the memory 1230, and control the transceiver 1220 to receive and send information or signals. The processor 1210 executes the instruction in the memory 1230, so that the processes corresponding to the network device in the method embodiments in FIG. 2 to FIG. 9 can be completed. To avoid repetition, details are not described herein again.

It should be understood that, the network device 1200 may be corresponding to the network device 1000 in FIG. 10, functions of the processing unit 1010 in the network device 1000 may be implemented by the processor 1210, and functions of the transceiver unit 1020 may be implemented by the transceiver 1220.

Therefore, in this embodiment of this application, the terminal device sends the preamble at the current level by using power determined in a power ramping manner, and a prior-art manner of directly sending a preamble by using maximum power is abandoned. This can reduce impact on another terminal device.

It should be noted that the processor (for example, the processor 1210 in FIG. 12 or the processor 1110 in FIG. 11) in the embodiments of this application may be an integrated circuit chip having a signal processing capability. In an implementation process, steps in the foregoing method embodiments may be implemented by using a hardware integrated logical circuit in the processor, or by using an instruction in a form of software. The processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams that are disclosed in the embodiments of this application. The general purpose processor may be a microprocessor, or the processor may be any conventional processor or the like. Steps in the methods disclosed with reference to the embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory (such as the memory 1230 in FIG. 12 or the memory 1130 in FIG. 11) in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM. EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these memories and any memory of another proper type.

An embodiment of this application further provides a computer-readable medium. The computer-readable medium stores a computer program, and when the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

The foregoing embodiments may be completely or partially implemented by using software, hardware, firmware, or any combination thereof. When the embodiment is implemented by using software, the embodiment may be implemented completely or partially in a form of a computer program product. The computer program product includes one or more computer instructions. When the computer instruction is loaded and executed on a computer, all or some of the procedure or functions according to the embodiments of this application are generated. The computer may be a general purpose computer, a dedicated computer, a computer network, or another programmable apparatus. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid state disk, SSD)), or the like.

It should be understood that the processing apparatus may be a chip, and the processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor, and exist independently.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may usually be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, "B corresponding to A" indicates that B is associated with A, and B may be determined according to A. However, it should also be understood that determining B according to A does not mean that B is determined only according to A, but B may alternatively be determined according to A and/or other information.

A person of ordinary skill in the art may be aware that, in combination with the examples described in the embodiments disclosed in this specification, units and algorithm steps can be implemented by using electronic hardware, computer software, or a combination thereof. To clearly describe interchangeability between the hardware and the software, the foregoing generally describes compositions and steps of each example based on functions. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In addition, functional units in the embodiments of this application may be integrated into one processing unit, or each of the units may exist alone physically, or at least two units are integrated into one unit. The integrated unit may be implemented in a form of hardware, or may be implemented in a form of a software functional unit.

With descriptions of the foregoing implementations, a person skilled in the art may clearly understand that this application may be implemented by using hardware, firmware, or a combination thereof. When this application is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a computer. The following provides an example but does not impose any limitation: The computer-readable medium may include a RAM, a ROM, an EEPROM, a CD-ROM, other optical disc storage, a magnetic disk storage medium, another magnetic storage device, or any other medium that can carry or store expected program code in a form of an instruction or a data structure and that is accessible to a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk (disk) or a disc (disc) used in this application includes a compact disc (CD), a laser disc, an optical disc, a digital versatile disc (DVD), a floppy disk, and a Blu-ray disc, where the disk generally copies data by a magnetic means, and the disc copies data optically by using a laser. The foregoing combination should also be included in the protection scope of the computer-readable medium.

In sum, the foregoing descriptions are merely examples of the embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, comprising:
receiving, by a terminal device, a system message from a network device, wherein the system message carries configuration information indicating the terminal device to send downlink channel quality indication information to the network device;
sending, by the terminal device to the network device, a random access preamble;
receiving, by the terminal device, a random access response (RAR) from the network device, wherein the RAR indicates a first resource; and
sending, by the terminal device, the downlink channel quality indication information to the network device based on the configuration information, wherein the downlink channel quality indication information is carried in a Message 3 on the first resource, the downlink channel quality indication information indicates downlink channel quality, and the downlink channel quality indication information comprises a quantity of narrowband physical downlink control channel (NPDCCH) repetition times associated with RAR demodulation.

2. The method according to claim 1, further comprises:
determining, by the terminal device, a current coverage level from at least two coverage levels, wherein each of the at least two coverage levels corresponds to a power ramp step; and
wherein the sending, by the terminal device to the network device, the random access preamble, comprises:
sending the random access preamble in a power ramping manner based on a current power ramp step corresponding to the current coverage level.

3. The method according to claim 2, wherein
the sending the random access preamble in the power ramping manner based on the current power ramp step corresponding to the current coverage level, comprises:
in response to failing in sending the preamble, increasing, by the terminal device, transmit power of the preamble by the current power ramp step, to obtain new transmit power; and
resending, by the terminal device, the preamble by using the new transmit power.

4. The method according to claim 2, wherein the method further comprises:
in response to a quantity of times of sending the preamble by the terminal device at the current coverage level is greater than a first threshold, sending, by the terminal device, the preamble to the network device at a next coverage level of the current coverage level, wherein the first threshold is less than a maximum quantity of times of transmitting a preamble at the current coverage level.

5. The method according to claim 4, wherein the sending, by the terminal device, the preamble to the network device at the next coverage level of the current coverage level comprises:
sending, by the terminal device, the preamble in a power ramping manner by using a quantity of repetition times corresponding to the next coverage level and the current power ramp step corresponding to the current coverage level.

6. The method according to claim 1, further comprises:
sending, by the network device, the system message to the terminal device;
receiving, by the network device, the random access preamble from the terminal device;
sending, by the network device, the RAR to the terminal device;
receiving, by the network device, the downlink channel quality indication information from the terminal device.

7. The method according to claim 6, further comprises:
determining, by the network device, a maximum quantity of repetition times of sending a Message 4 or a maximum value of a UE-specific search space (USS) of the terminal device based on the downlink channel quality.

8. An apparatus, comprising:
at least one processor; and
a non-transitory memory coupled to the at least one processor and storing programming instructions for execution by the at least one processor to cause the apparatus to:
receive a system message from a network device, wherein the system message carries configuration information indicating the apparatus to send downlink channel quality indication information to the network device;

send a random access preamble to the network device;
receive a random access response (RAR) from the network device, wherein the RAR indicates a first resource; and
send the downlink channel quality indication information to the network device based on the configuration information, wherein the downlink channel quality indication information is carried in a Message 3 on the first resource, the downlink channel quality indication information indicates downlink channel quality, and the downlink channel quality indication information comprises a quantity of narrowband physical downlink control channel (NPDCCH) repetition times associated with RAR demodulation.

9. The apparatus according to claim 8, wherein the non-transitory memory stores programming instructions for execution by the at least one processor to:
determine a current coverage level from at least two coverage levels, wherein each of the at least two coverage levels corresponds to a power ramp step; and
send the random access preamble in a power ramping manner based on a current power ramp step corresponding to the current coverage level.

10. The apparatus according to claim 9, wherein the non-transitory memory stores programming instructions for execution by the at least one processor to:
in response to failing in sending the preamble, increase transmit power of the preamble by the current power ramp step to obtain new transmit power; and
resend the preamble by using the new transmit power.

11. The apparatus according to claim 9, wherein the non-transitory memory stores programming instructions for execution by the at least one processor to:
in response to a quantity of times of sending the preamble at the current coverage level is greater than a first threshold, send the preamble to the network device at a next coverage level of the current coverage level, wherein the first threshold is less than a maximum quantity of times of transmitting a preamble at the current coverage level.

12. The apparatus according to claim 11, wherein the non-transitory memory stores programming instructions for execution by the at least one processor to:
send the preamble in a power ramping manner by using a quantity of repetition times corresponding to the next coverage level and the current power ramp step corresponding to the current coverage level.

13. A non-transitory computer-readable storage medium comprising instructions for:
receiving a system message from a network device, wherein the system message carries configuration information indicating a terminal device to send downlink channel quality indication information to the network device;
sending a random access preamble to the network device;
receiving a random access response (RAR) from the network device, wherein the RAR indicates a first resource; and
sending the downlink channel quality indication information to the network device based on the configuration information, wherein the downlink channel quality indication information is carried in a Message 3 on the first resource, the downlink channel quality indication information indicates downlink channel quality, and the downlink channel quality indication information comprises a quantity of narrowband physical downlink control channel (NPDCCH) repetition times associated with RAR demodulation.

14. The non-transitory computer-readable storage medium according to claim 13, comprises instructions for:
determining a current coverage level from at least two coverage levels, wherein each of the at least two coverage levels corresponds to a power ramp step; and
sending the random access preamble in a power ramping manner based on a current power ramp step corresponding to the current coverage level.

15. The non-transitory computer-readable storage medium according to claim 14, comprises instructions for:
when failing in sending the preamble, increasing transmit power of the preamble by the current power ramp step to obtain new transmit power; and
resending the preamble by using the new transmit power.

16. The non-transitory computer-readable storage medium according to claim 14, comprises instructions for:
in response to a quantity of times of sending the preamble at the current coverage level is greater than a first threshold, sending the preamble to the network device at a next coverage level of the current coverage level, wherein the first threshold is less than a maximum quantity of times of transmitting a preamble at the current coverage level.

* * * * *